United States Patent
James et al.

(10) Patent No.: US 8,972,903 B2
(45) Date of Patent: Mar. 3, 2015

(54) USING GESTURE TO NAVIGATE HIERARCHICALLY ORDERED USER INTERFACE SCREENS

(75) Inventors: Bryan J. James, Menlo Park, CA (US); Policarpo Bonilla Wood, Jr., San Francisco, CA (US); Jorge Fino, San Jose, CA (US); Jeffrey Theodore Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 12/832,900

(22) Filed: Jul. 8, 2010

(65) Prior Publication Data

US 2012/0011437 A1 Jan. 12, 2012

(51) Int. Cl.
 G06F 3/041 (2006.01)
 G06F 3/0488 (2013.01)
 G06F 1/16 (2006.01)
 G06F 3/0482 (2013.01)

(52) U.S. Cl.
 CPC .......... G06F 3/04883 (2013.01); G06F 1/1643 (2013.01); G06F 3/0482 (2013.01); *G06F 2203/04808* (2013.01)
 USPC ............ 715/863; 715/727; 715/864; 345/173

(58) Field of Classification Search
 None
 See application file for complete search history.

(56) References Cited

U.S. PATENT DOCUMENTS

| 7,458,014 B1 | 11/2008 | Rubin et al. |
| 2002/0126148 A1 | 9/2002 | Rosenkranz et al. |
| 2004/0055446 A1 | 3/2004 | Robbin et al. |
| 2009/0007017 A1 | 1/2009 | Anzures et al. |
| 2009/0064055 A1* | 3/2009 | Chaudhri et al. ............. 715/863 |
| 2009/0172532 A1* | 7/2009 | Chaudhri ...................... 715/702 |

(Continued)

FOREIGN PATENT DOCUMENTS

| JP | 2000-155638 A | 6/2000 |
| JP | 2007-172767 A | 7/2007 |

(Continued)

OTHER PUBLICATIONS

International Search Report and Written Opinion dated Dec. 15, 2011, received in International Patent Application No. PCT/US2011/043302, which corresponds to U.S. Appl. No. 12/832,900 (James).

(Continued)

*Primary Examiner* — Stephen Hong
*Assistant Examiner* — Asher Kells
(74) *Attorney, Agent, or Firm* — Morrison & Foerster LLP

(57) ABSTRACT

A method of navigating between user interface screens, including displaying a third user interface screen in a plurality of user interface screens that also includes a first and a second predefined user interface screen, the third user interface screen being other than the first and the second predefined user interface screen; detecting a finger gesture on the touch-sensitive display while displaying the third user interface screen, and in response to detecting the finger gesture on the touch-sensitive display, replacing display of the third user interface screen with display of the first predefined user interface screen when the detected finger gesture is a first finger gesture, and replacing display of the third user interface screen with display of the second predefined user interface screen when the detected finger gesture is a second finger gesture that is a reverse of the first finger gesture.

20 Claims, 33 Drawing Sheets

(56) References Cited

U.S. PATENT DOCUMENTS

2009/0199130 A1\* 8/2009 Tsern et al. .................. 715/810
2009/0278806 A1 11/2009 Duarte et al.

FOREIGN PATENT DOCUMENTS

JP 2007-187708 A 7/2007
WO WO 2006/020305 A2 2/2006

OTHER PUBLICATIONS

International Preliminary Report on Patentability dated Jan. 17, 2013, received in international Application No. PCT/US2011/043302, which corresponds to U.S. Appl. No. 12/832,900, 10 pages (James).

Office Action dated Oct. 17, 2013, received in Australian Patent Application No. 1 2011274519, which corresponds to U.S. Appl. No. 12/832,900, 3 pages (James).

Office Action received for European Patent Application No. 11733962.2, mailed on Jan. 22, 2014, 4 pages.

Office Action received for Japanese Patent Application No. 2013-518852, mailed on Feb. 10, 2014, 3 pages. (See Communication under 37 CFR § 1.98(a) (3)).

Notice of Allowance received for Japanese Patent Application No. 2013-518852, mailed on Nov. 17, 2014, 3 pages. (See Communication under 37 CFR § 1.98(a) (3)).

Office Action received for Korean Patent Application No. 10-2013-7003037, mailed on Oct. 23, 2014, 7 pages (3 pages of English Translation and 4 pages of Official Copy).

\* cited by examiner

USING GESTURE TO NAVIGATE HIERARCHICALLY ORDERED USER INTERFACE SCREENS

TECHNICAL FIELD

This relates generally to electronic devices with touch-sensitive surfaces, including but not limited to electronic devices with touch-sensitive surfaces for navigating between user interface screens.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to navigate through a user interface on a display and to manipulate user interface objects on a display.

But existing methods for navigating between user interface screens are cumbersome and inefficient. For example, navigating from one user interface screen to another through a sequence of intermediate user interface screens is tedious and creates a significant cognitive burden on a user. In addition, existing methods take longer than necessary, thereby wasting energy. This latter consideration is particularly important in battery-operated devices.

SUMMARY

Accordingly, there is a need for computing devices with faster, more efficient methods and interfaces for navigating between user interface screens. Such methods and interfaces may complement or replace conventional methods for navigating between user interface screens. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a portable electronic device with a touch-sensitive display, where the touch-sensitive display is configured to separately display a plurality of user interface screens, including a first predefined user interface screen and a second predefined user interface screen. The method includes: displaying a third user interface screen in the plurality of user interface screens, the third user interface screen being other than the first predefined user interface screen and the second predefined user interface screen; detecting a finger gesture on the touch-sensitive display while displaying the third user interface screen; and in response to detecting the finger gesture on the touch-sensitive display, replacing display of the third user interface screen with display of the first predefined user interface screen when the detected finger gesture is a first finger gesture, and replacing display of the third user interface screen with display of the second predefined user interface screen when the detected finger gesture is a second finger gesture that is a reverse of the first finger gesture.

In accordance with some embodiments, a portable electronic device includes a touch-sensitive surface display, one or more processors, memory, and one or more programs. The touch-sensitive display is configured to separately display a plurality of user interface screens, including a first predefined user interface screen and a second predefined user interface screen. The one or more programs are stored in the memory and configured to be executed by the one or more processors. The one or more programs include instructions for: displaying a third user interface screen in the plurality of user interface screens, the third user interface screen being other than the first predefined user interface screen and the second predefined user interface screen; detecting a finger gesture on the touch-sensitive display while displaying the third user interface screen; and in response to detecting the finger gesture on the touch-sensitive display, replacing display of the third user interface screen with display of the first predefined user interface screen when the detected finger gesture is a first finger gesture, and replacing display of the third user interface screen with display of the second predefined user interface screen when the detected finger gesture is a second finger gesture that is a reverse of the first finger gesture.

In accordance with some embodiments, a computer readable storage medium has stored therein instructions which when executed by a portable electronic device with a touch-sensitive display, the touch-sensitive display configured to separately display a plurality of user interface screens, including a first predefined user interface screen and a second predefined user interface screen, cause the device to: display a third user interface screen in the plurality of user interface screens, the third user interface screen being other than the first predefined user interface screen and the second predefined user interface screen; detect a finger gesture on the touch-sensitive display while displaying the third user interface screen; and in response to detecting the finger gesture on the touch-sensitive display, replace display of the third user interface screen with display of the first predefined user interface screen when the detected finger gesture is a first finger gesture; and replace display of the third user interface screen with display of the second predefined user interface screen when the detected finger gesture is a second finger gesture that is a reverse of the first finger gesture.

In accordance with some embodiments, a graphical user interface on a portable electronic device with a touch-sensitive display, a memory, and one or more processors to execute one or more programs stored in the memory includes a plurality of separately displayed user interface screens, including a first predefined user interface screen and a second predefined user interface screen. A third user interface screen in the plurality of user interface screens is displayed, the third user interface screen being other than the first predefined user interface screen and the second predefined user interface screen. A finger gesture is detected on the touch-sensitive display while the third user interface screen is displayed. In response to detection of the finger gesture on the touch-sensitive display while the third user interface screen is displayed, display of the third user interface screen is replaced with display of the first predefined user interface screen when the detected finger gesture is a first finger gesture, and display of the third user interface screen is replaced with display of the second predefined user interface screen when the detected finger gesture is a second finger gesture that is a reverse of the first finger gesture.

In accordance with some embodiments, a portable electronic device includes: a touch-sensitive display, where the touch-sensitive display is configured to separately display a plurality of user interface screens, including a first predefined user interface screen and a second predefined user interface screen; means for displaying a third user interface screen in the plurality of user interface screens, the third user interface screen being other than the first predefined user interface screen and the second predefined user interface screen; means for detecting a finger gesture on the touch-sensitive display while displaying the third user interface screen; means for, in response to detecting the finger gesture on the touch-sensitive display, replacing display of the third user interface screen with display of the first predefined user interface screen when the detected finger gesture is a first finger gesture; and means for, in response to detecting the finger gesture on the touch-sensitive display, replacing display of the third user interface screen with display of the second predefined user interface screen when the detected finger gesture is a second finger gesture that is a reverse of the first finger gesture.

In accordance with some embodiments, an information processing apparatus for use in a portable electronic device with a touch-sensitive display, the touch-sensitive display configured to separately display a plurality of user interface screens, including a first predefined user interface screen and a second predefined user interface screen, includes: means for displaying a third user interface screen in the plurality of user interface screens, the third user interface screen being other than the first predefined user interface screen and the second predefined user interface screen; means for detecting a finger gesture on the touch-sensitive display while displaying the third user interface screen; means for, in response to detecting the finger gesture on the touch-sensitive display, replacing display of the third user interface screen with display of the first predefined user interface screen when the detected finger gesture is a first finger gesture; and means for, in response to detecting the finger gesture on the touch-sensitive display, replacing display of the third user interface screen with display of the second predefined user interface screen when the detected finger gesture is a second finger gesture that is a reverse of the first finger gesture.

Thus, portable electronic devices with touch-sensitive displays are provided with faster, more efficient methods and interfaces for navigating between user interface screens, thereby increasing the effectiveness, efficiency, and user satisfaction with such devices. Such methods and interfaces may complement or replace conventional methods for navigating between user interface screens.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
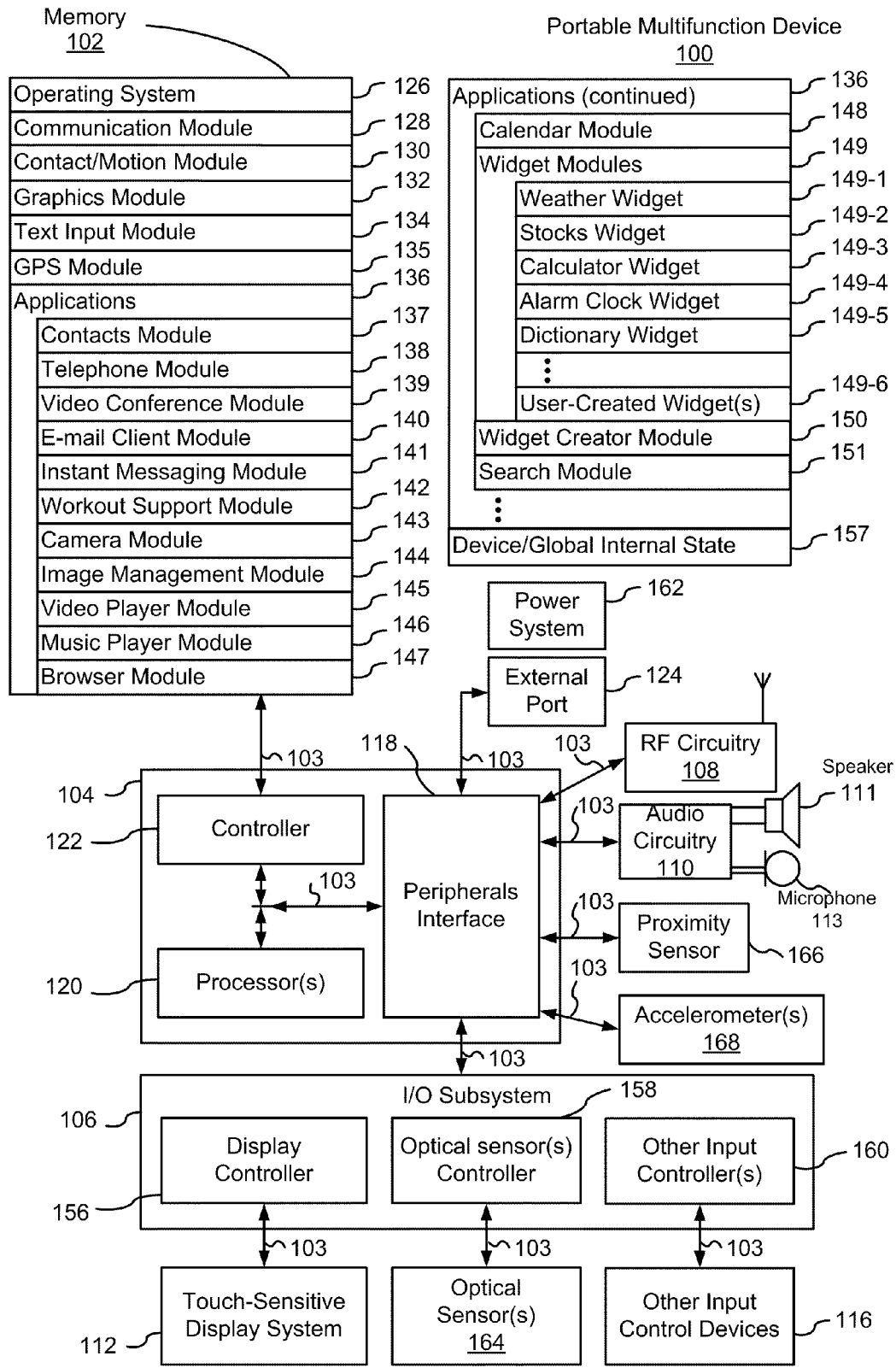
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone®, iPod Touch® and iPad® devices from Apple Inc. of Cupertino, Calif. In some other embodiments, the computing device is a portable electronic device that is used principally as a media player but may include other functions, such as video recording and/or FM radio reception. Exemplary embodiments of portable electronic devices that are used principally as media players include, without limitation, the iPod Nano® device from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
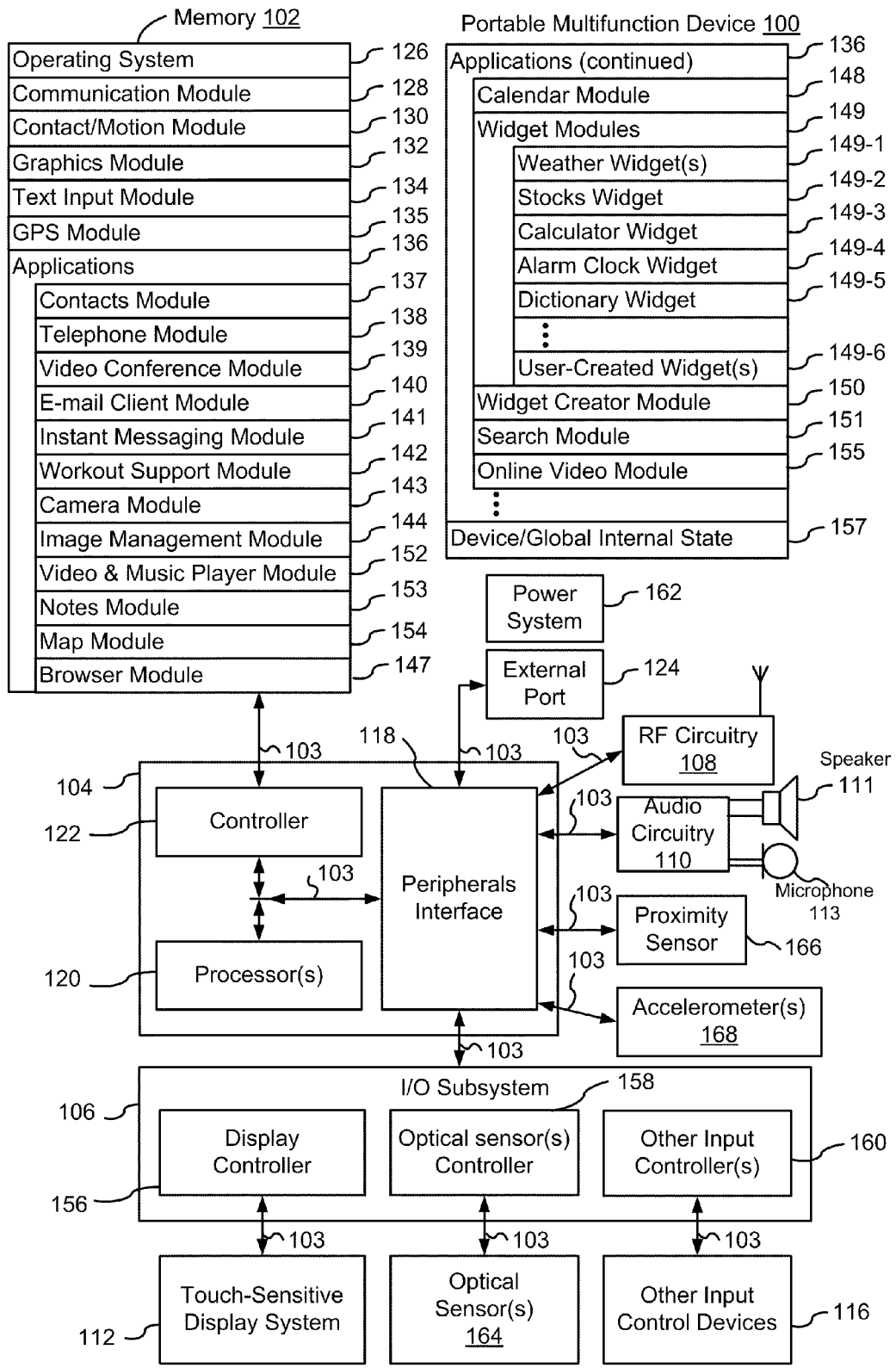

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846

(Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards and/or other text input methods for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
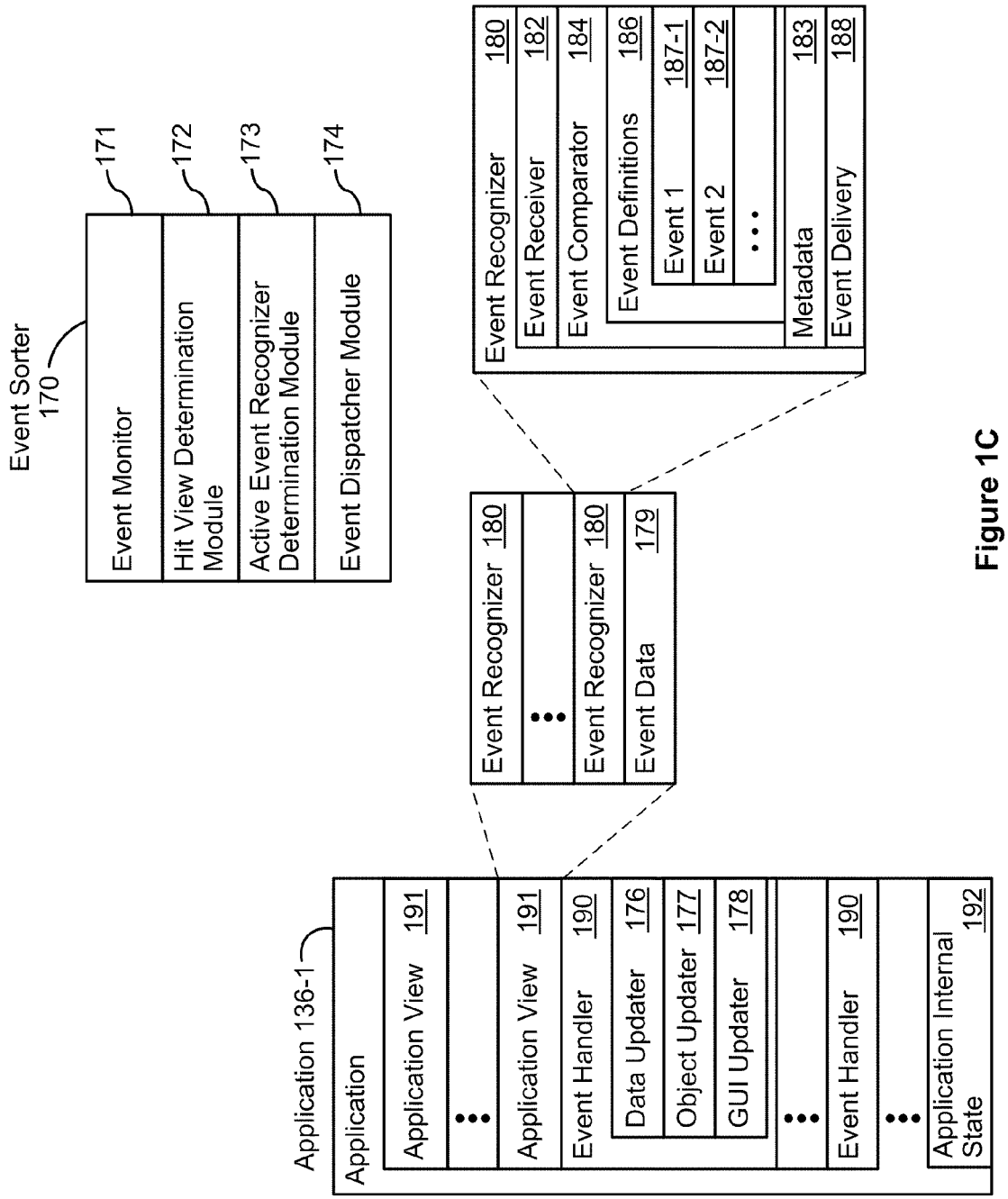
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
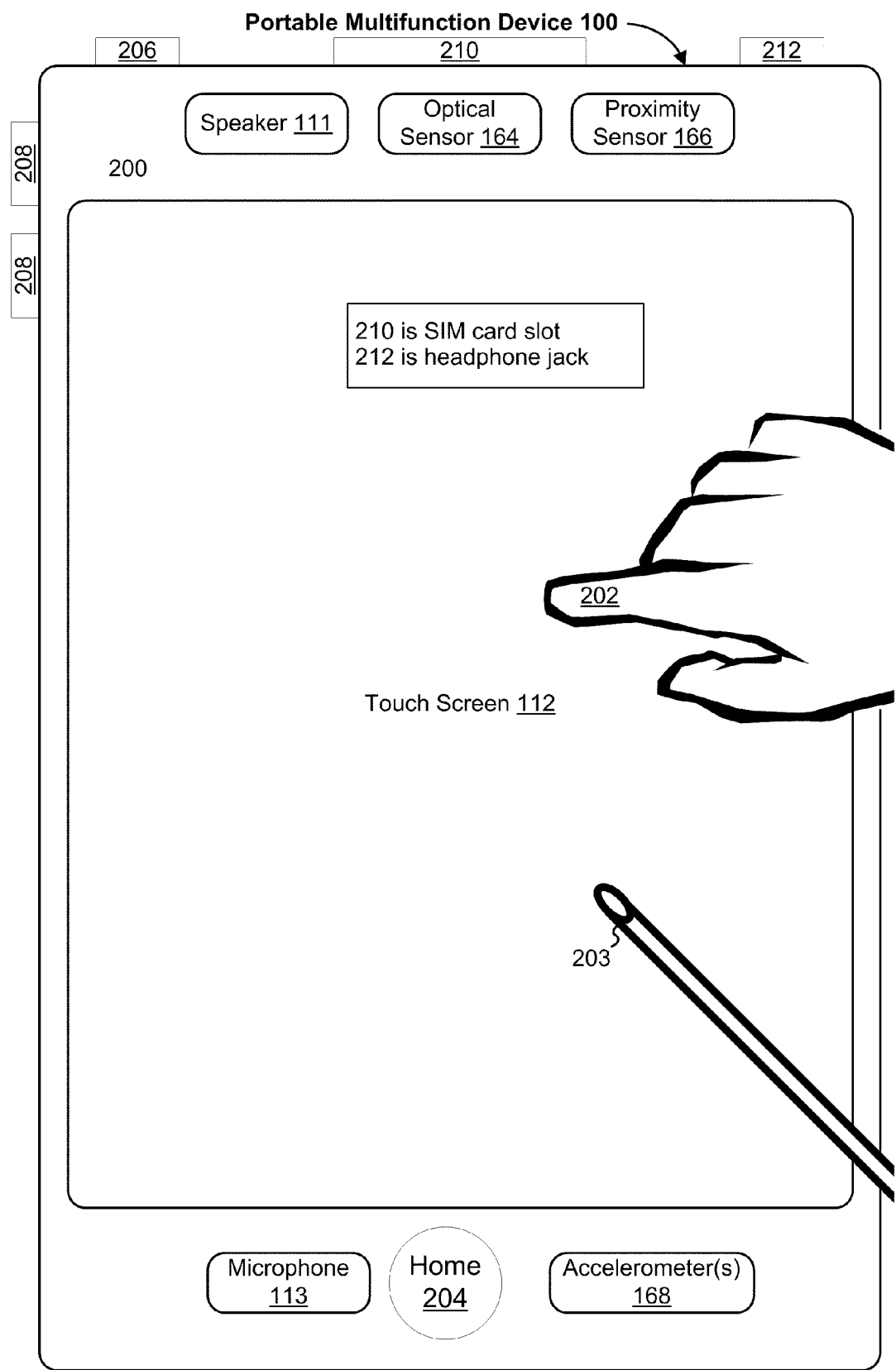
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

Figure 3A:
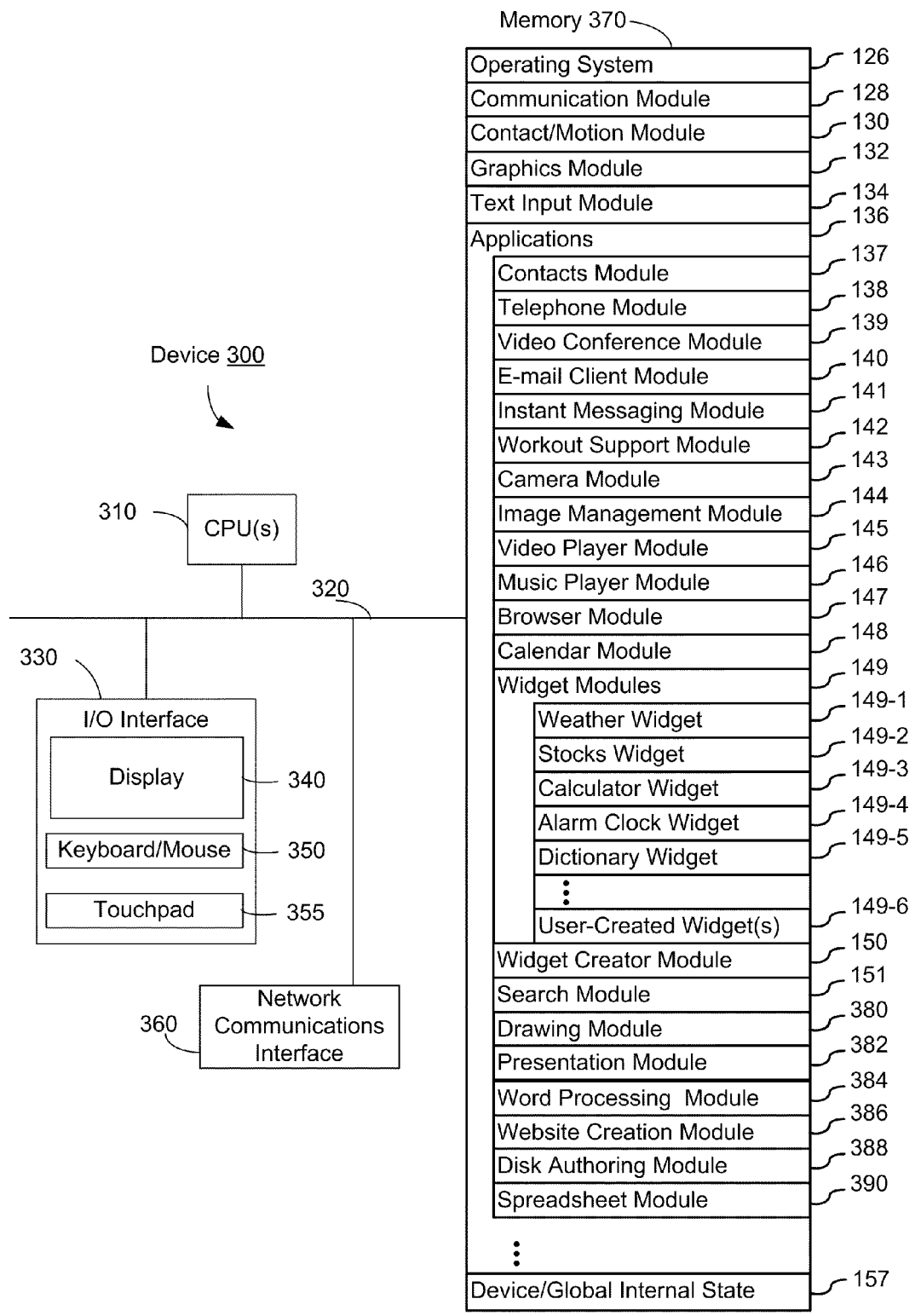
FIG. 3A is a block diagram of an exemplary multifunction device with a display and a touch-sensitive surface in accordance with some embodiments.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3A may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Figure 3B:
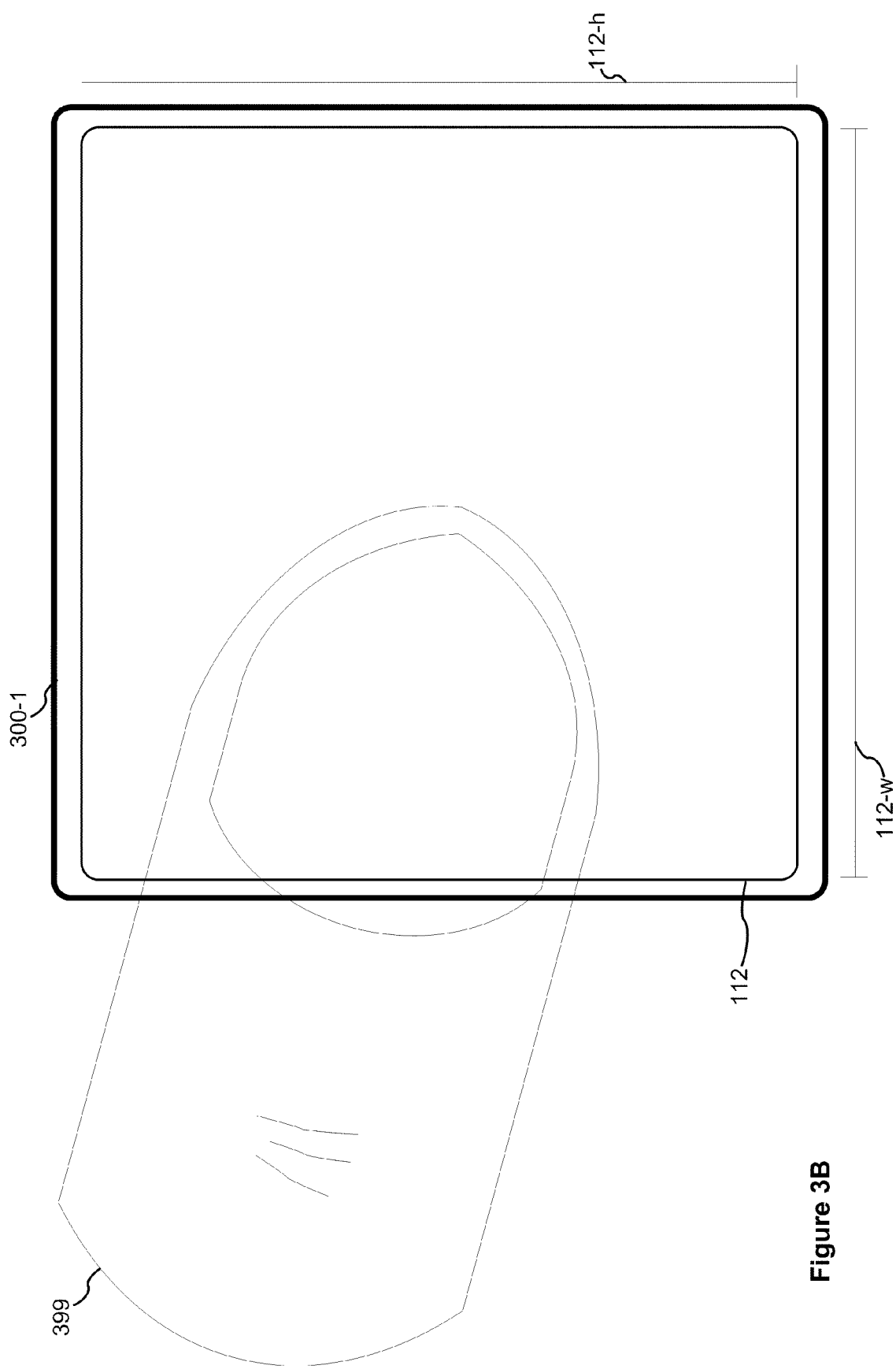
FIG. 3B illustrates an exemplary portable electronic device with a touch-screen in accordance with some embodiments.

Though electronic device 300 is depicted as a multifunction device including I/O interface 330 that incorporates keyboard/mouse 350 and touchpad 355, in some embodiments, electronic device 300-1, as illustrated in FIG. 3B, is a portable electronic device that uses touch-screen 112 without a keyboard, mouse, or independent touchpad. In some embodiments, device 300 is a portable electronic device with touch-screen 112, and is used principally as a portable media player.

For example, portable electronic device 300-1 includes touch-screen 112 with width 112-w and height 112-h, which in this example are both 2 inches. User's thumb 399, shown superimposed on touch-screen 112, is approximately half the width 112-w or height 112-h of touch-screen 112.

In some portable media player embodiments, touch-screen 112 may have physical dimensions of 2 inches or less in width and/or height. In some portable media player embodiments, touch-screen 112 may have a screen resolution of 600 pixels or less in width and/or height. In some portable media player embodiments, touch-screen 112 may have a screen resolution of 900 pixels or less in width and/or height. In some portable media player embodiments, touch-screen 112 may have a screen resolution of 1200 pixels or less in width and/or height.

In some embodiments, memory 370 may store a subset of the modules and data structures identified above. In some portable media player embodiments, electronic device 300-1 may be a smaller physical device, and typically would not include certain of the modules, data structures, and applications identified above that would be used in full-featured portable multifunction devices, e.g., as a portable electronic device 300-1 with touch-screen 112, one or more of the following may not be included: telephone module 138, chart module 144, drawing module 380, presentation module 382, word processing module 384, website creation module 386, and disk authoring module 388.

Attention is now directed towards embodiments of user interfaces ("UI") that may be implemented on portable multifunction device 100.

Figure 4A:
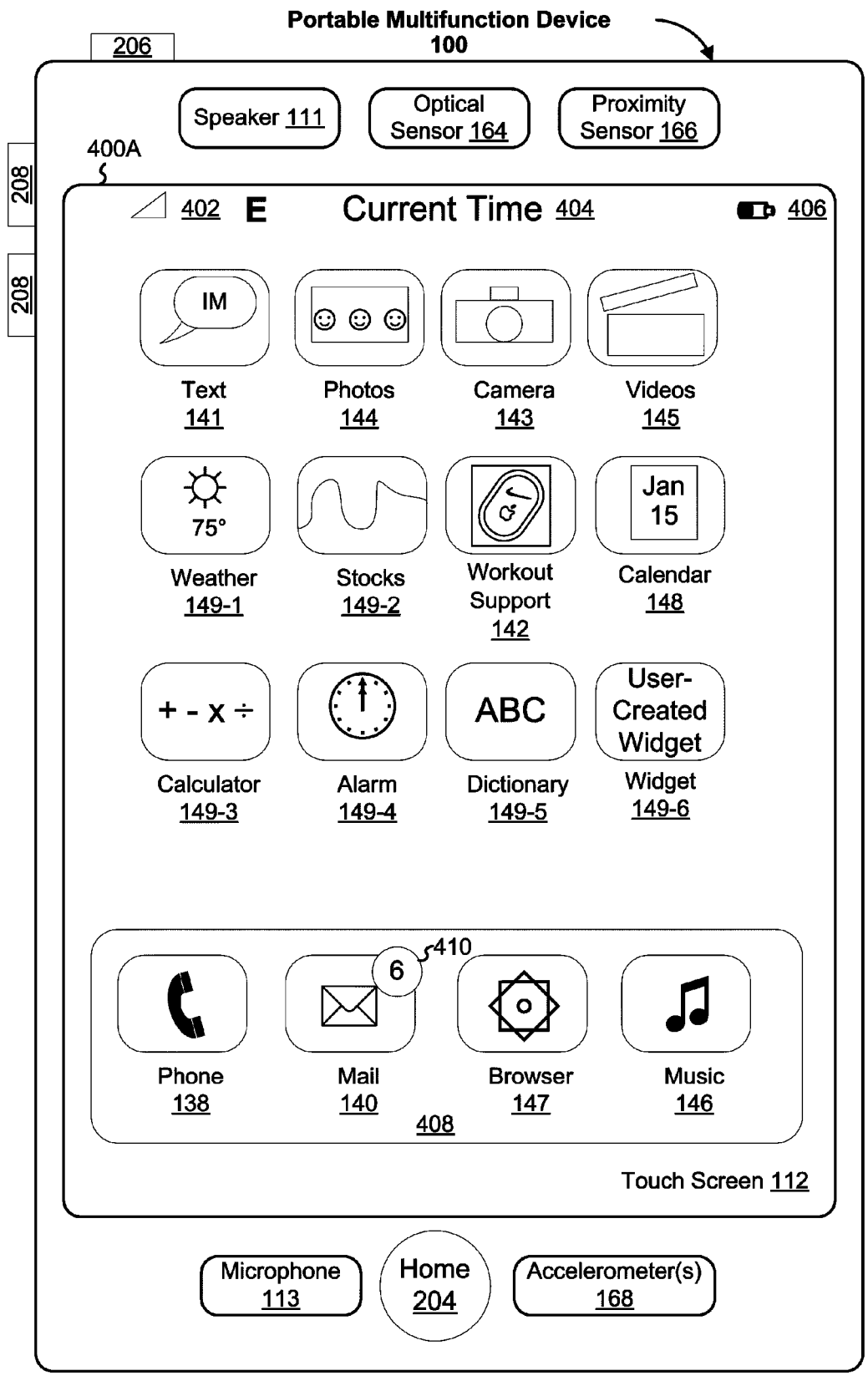
FIGS. 4A and 4B illustrate exemplary user interfaces for a menu of applications on a portable multifunction device in accordance with some embodiments.
Figure 4B:
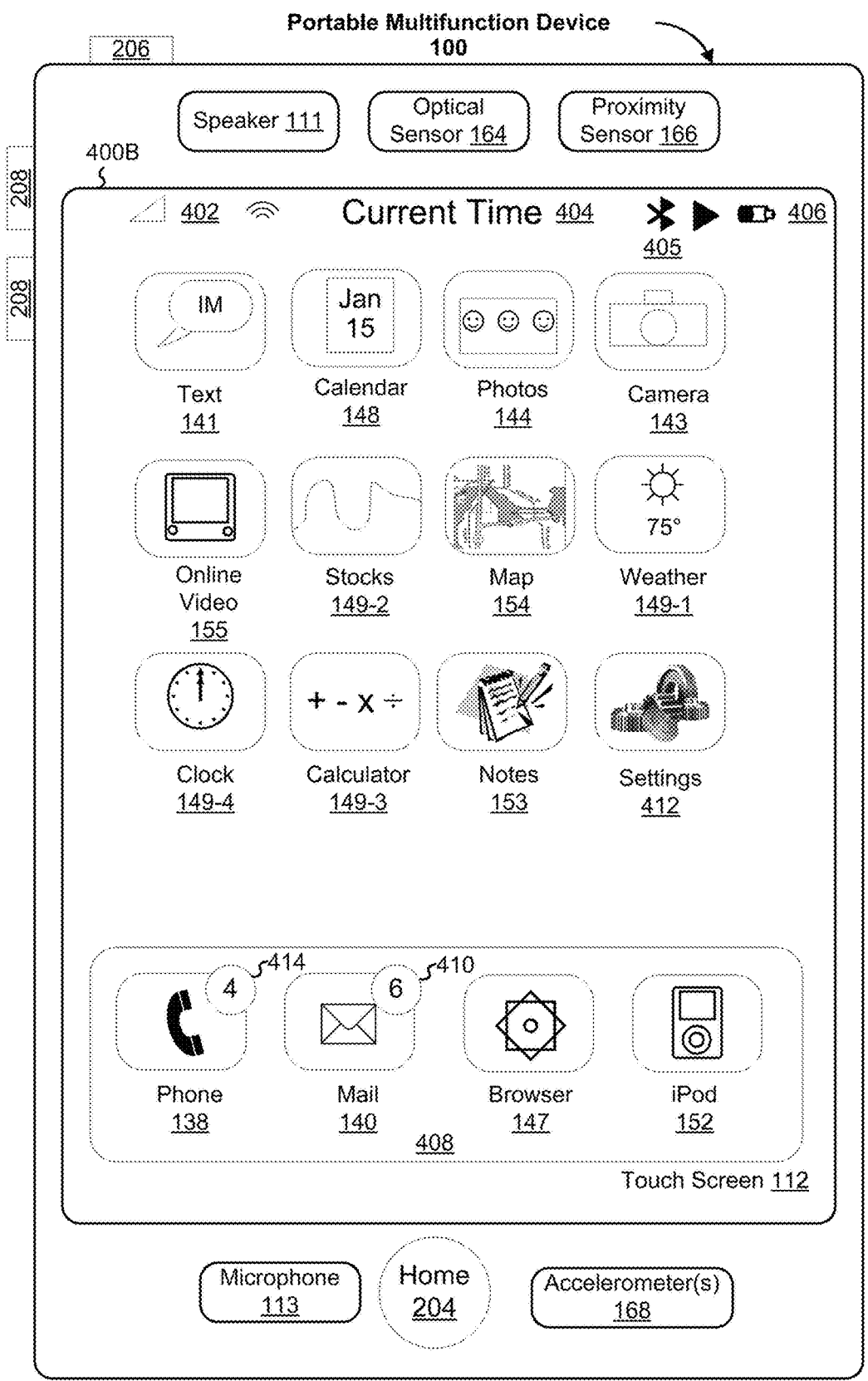

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

Figure 4C:
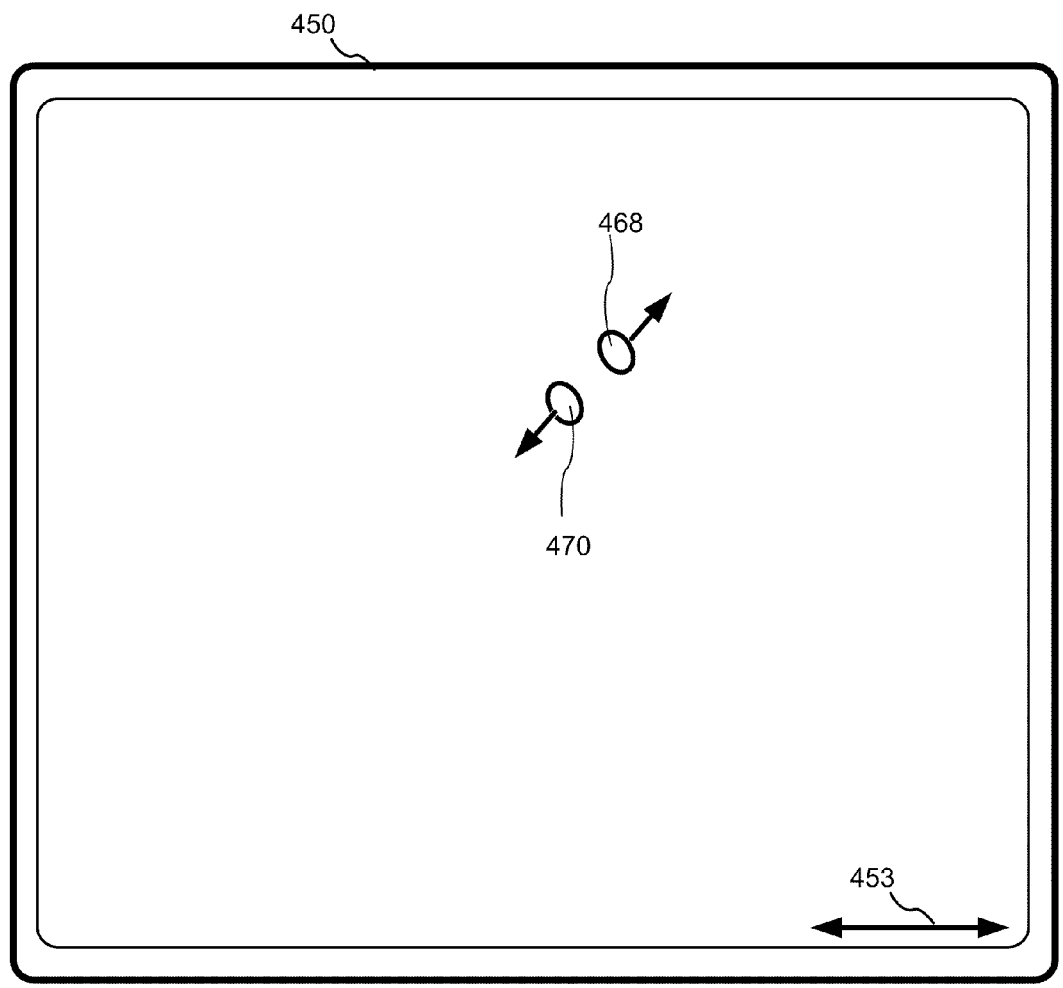
FIG. 4C illustrates an exemplary user interface for a multifunction device with a touch-sensitive surface that is separate from the display in accordance with some embodiments.
Figure 4C:
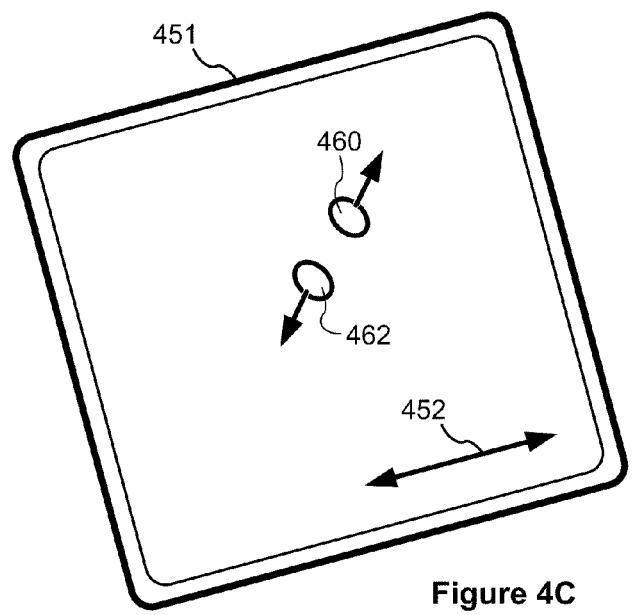

FIG. 4C illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300, device 300-1, or portable multifunction device 100.

Figure 5A:
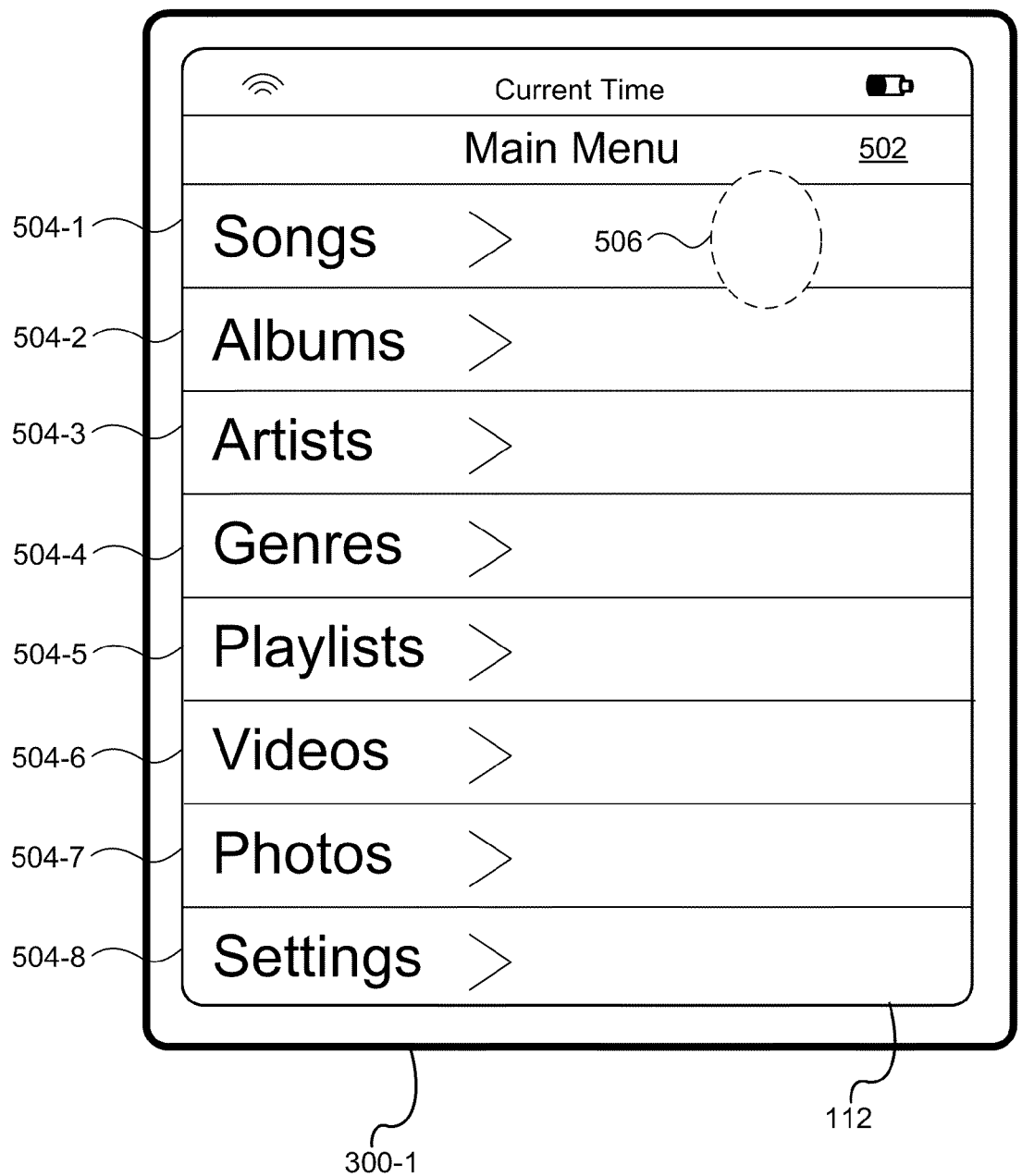
FIGS. 5A-5S illustrate exemplary user interface screens that are navigable in accordance with some embodiments.
Figure 5B:
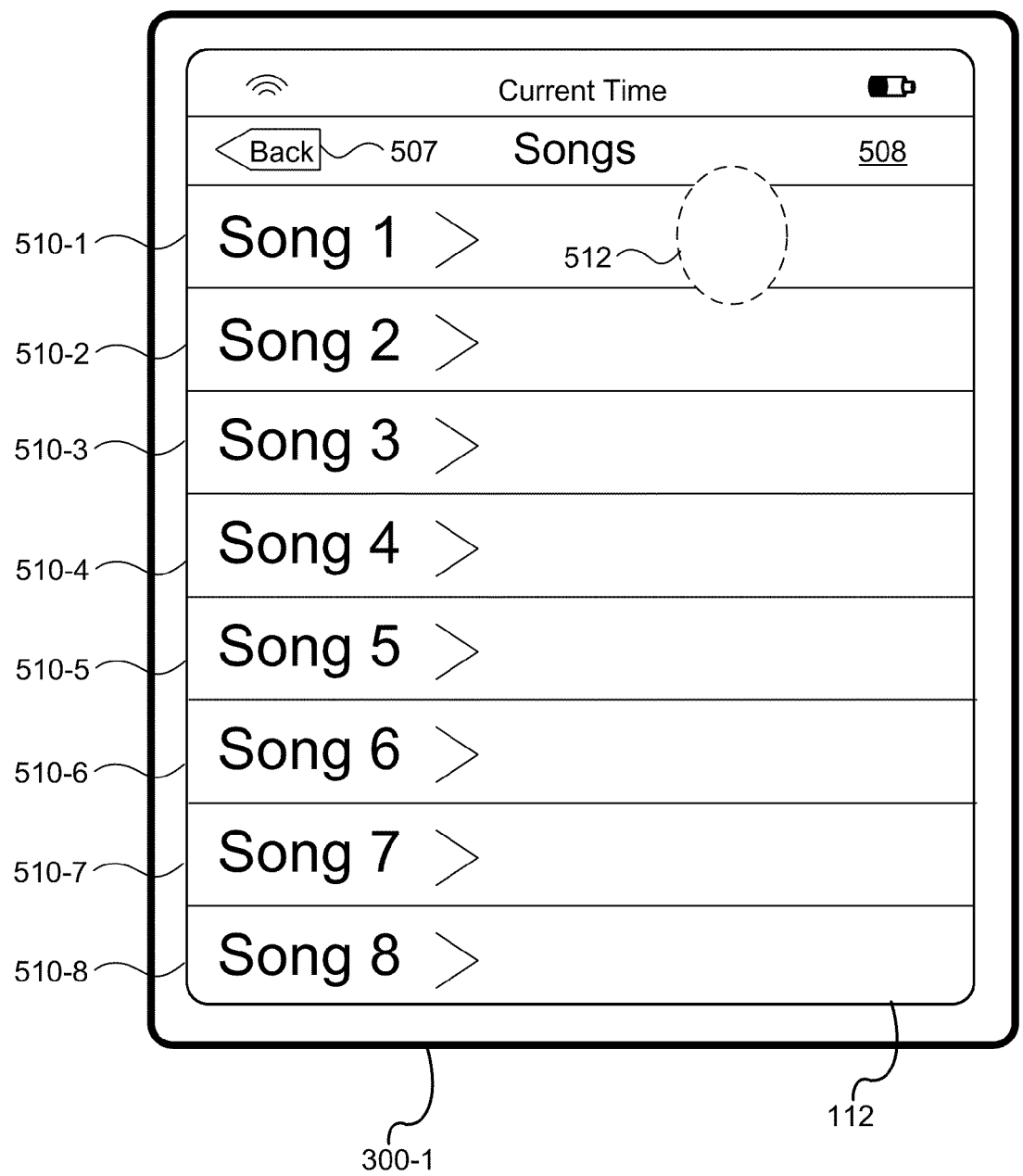
Figure 5C:
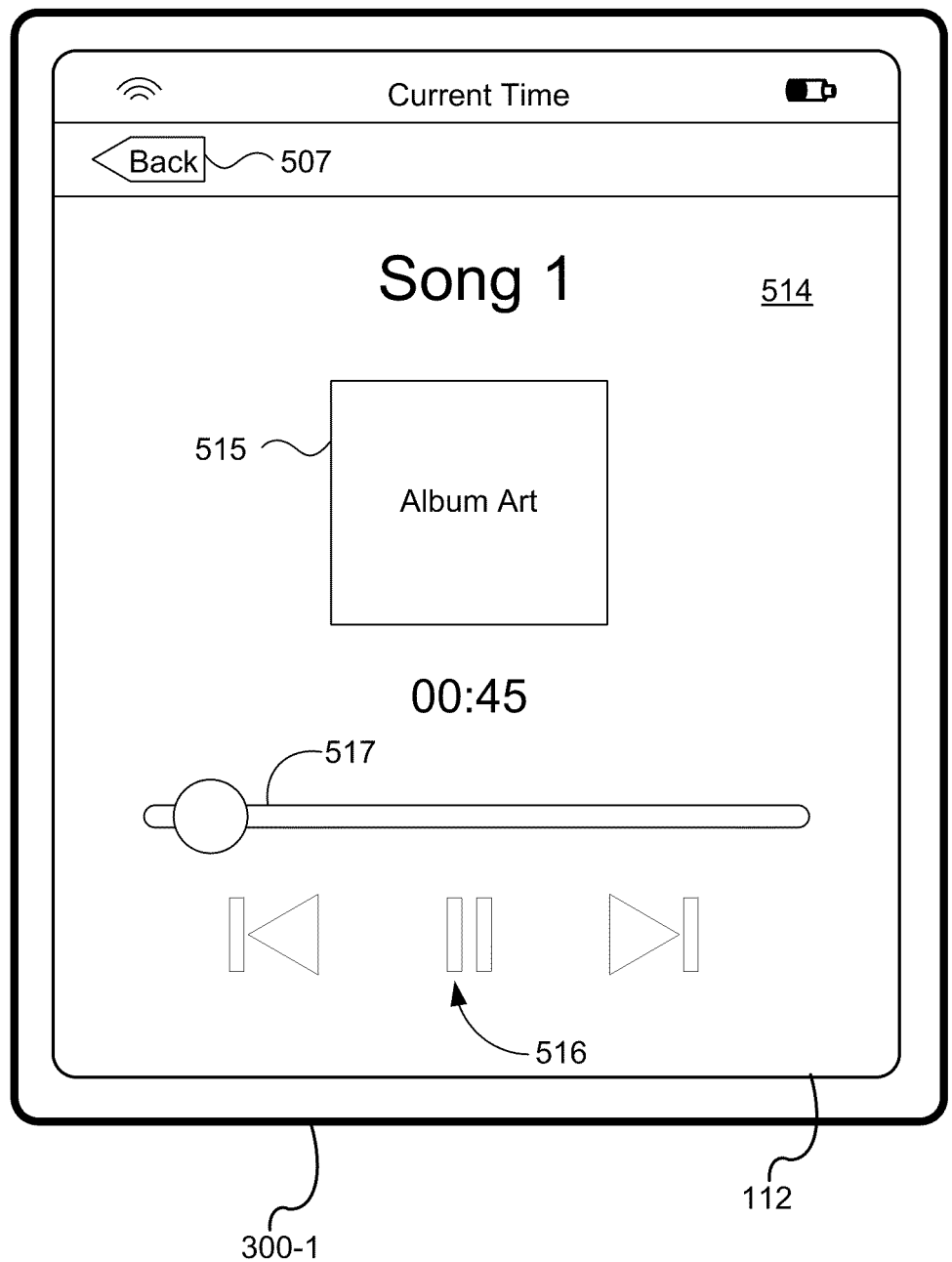
Figure 5D:
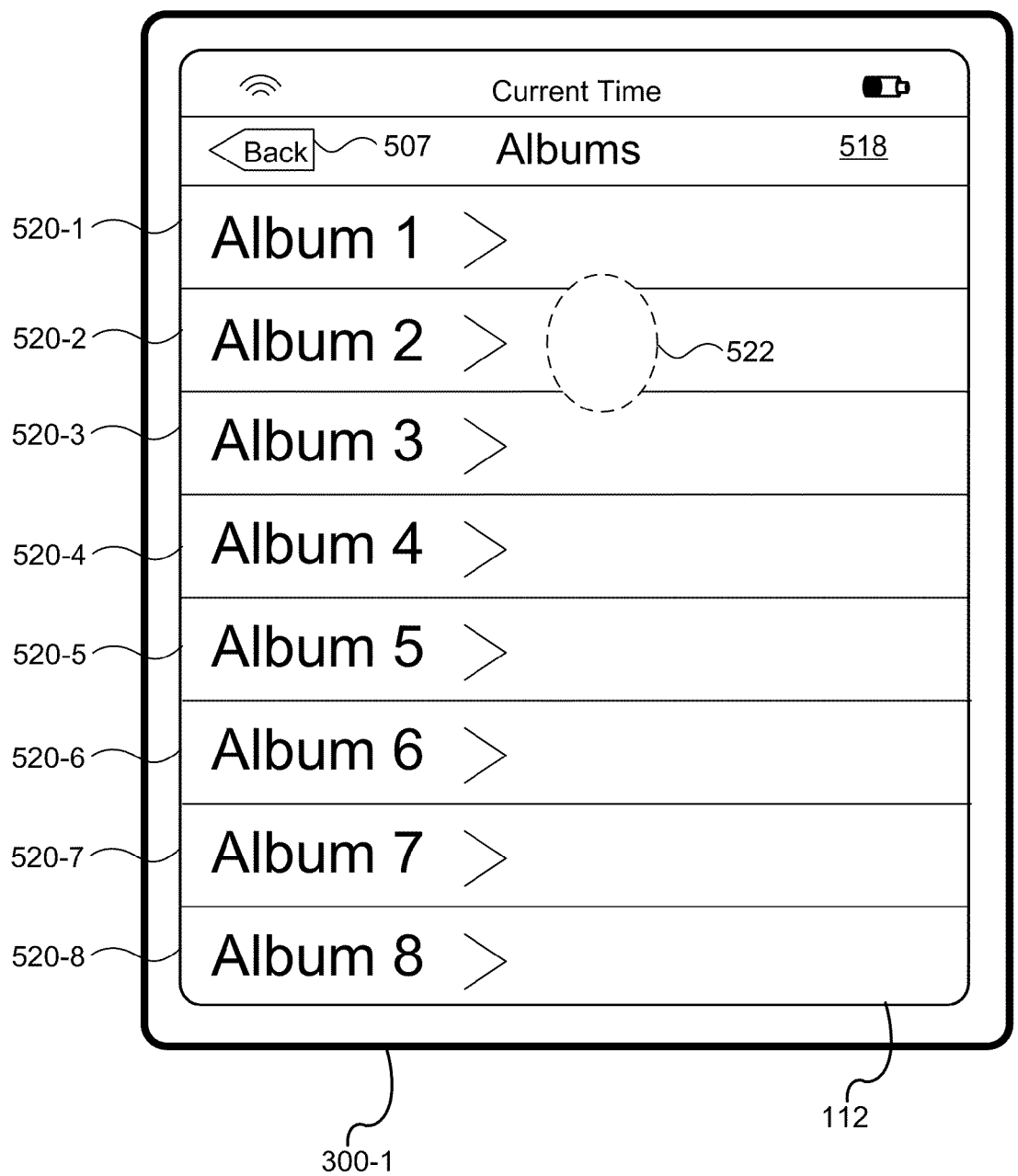
Figure 5E:
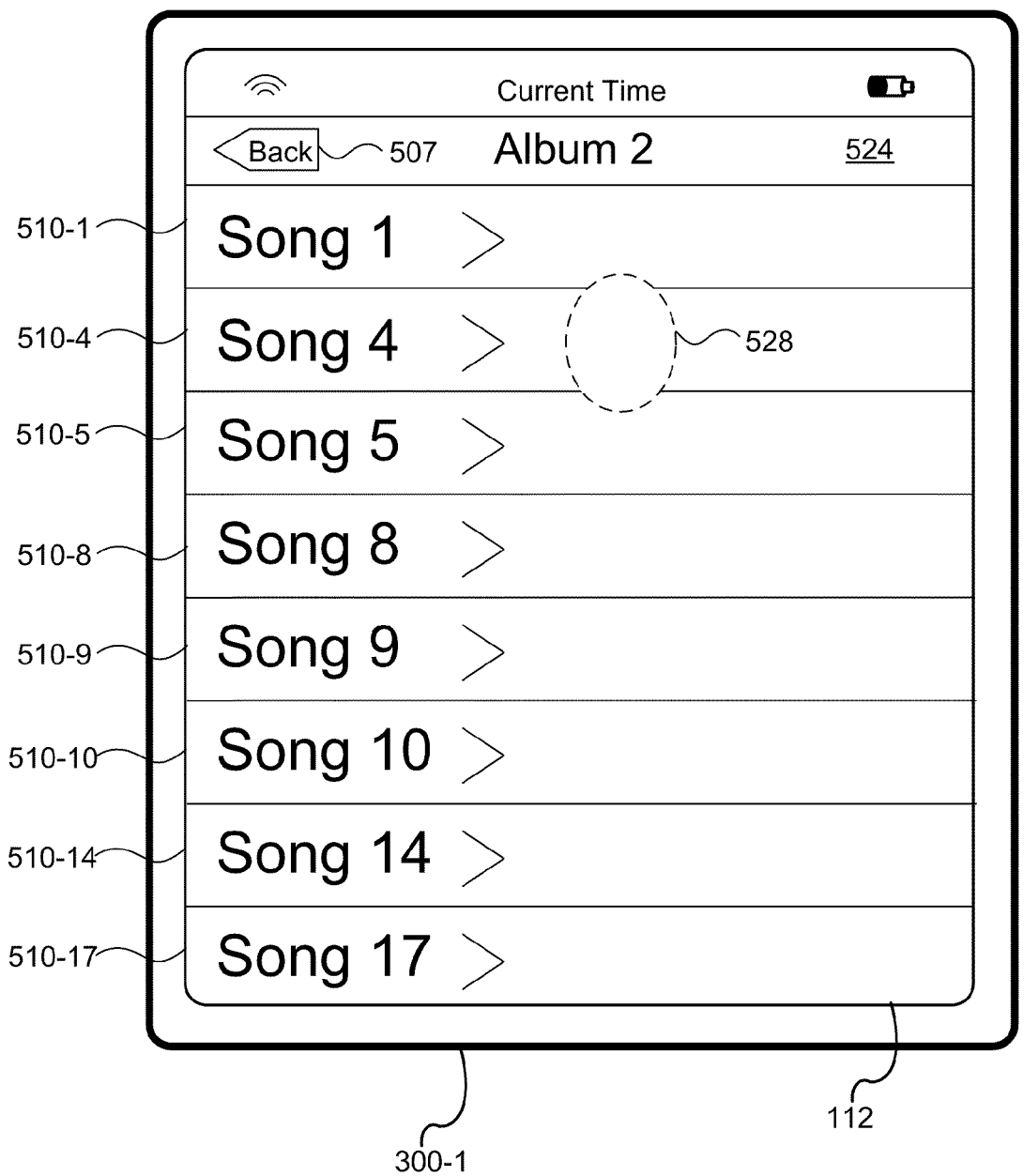
Figure 5F:
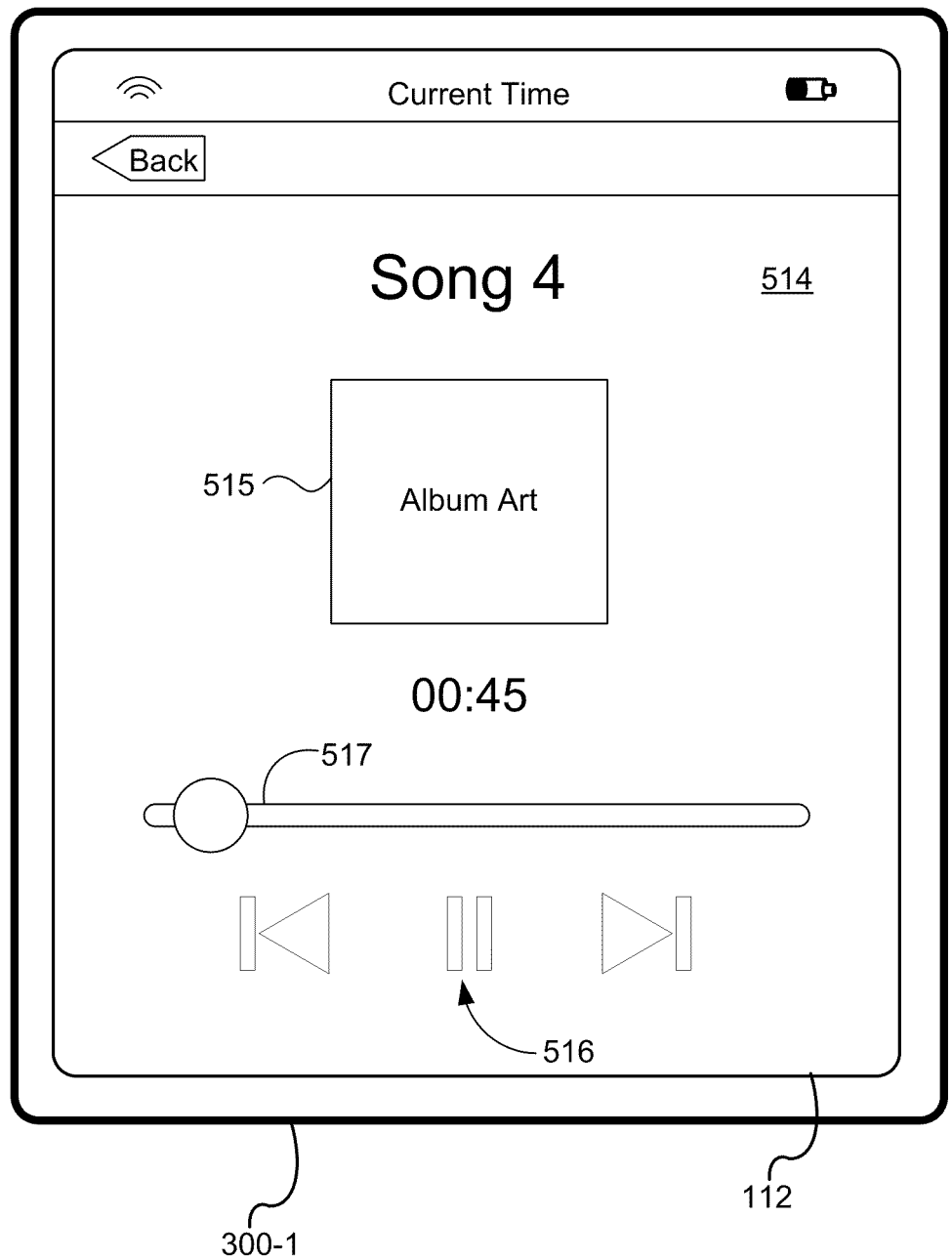
Figure 5G:
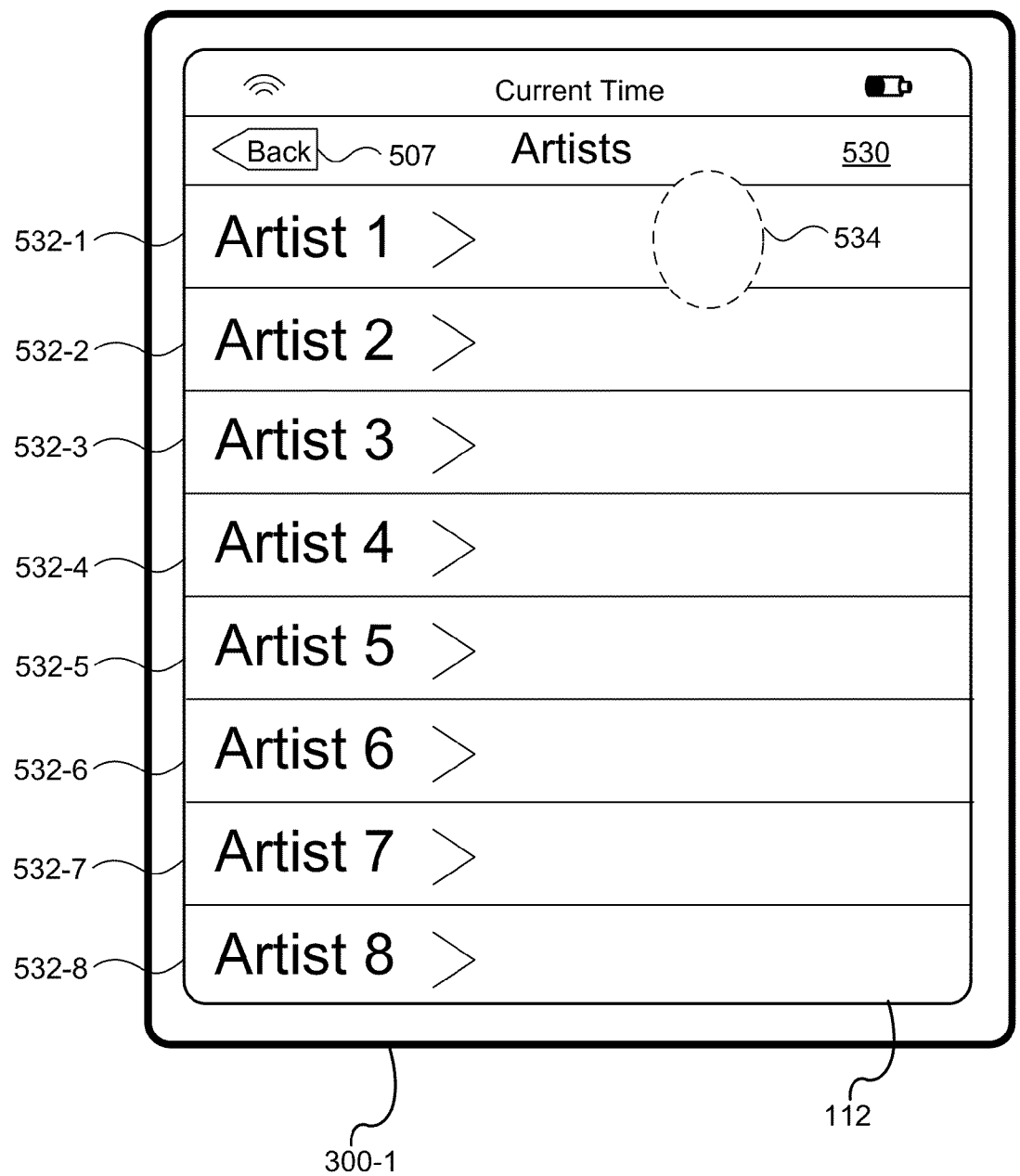
Figure 5H:
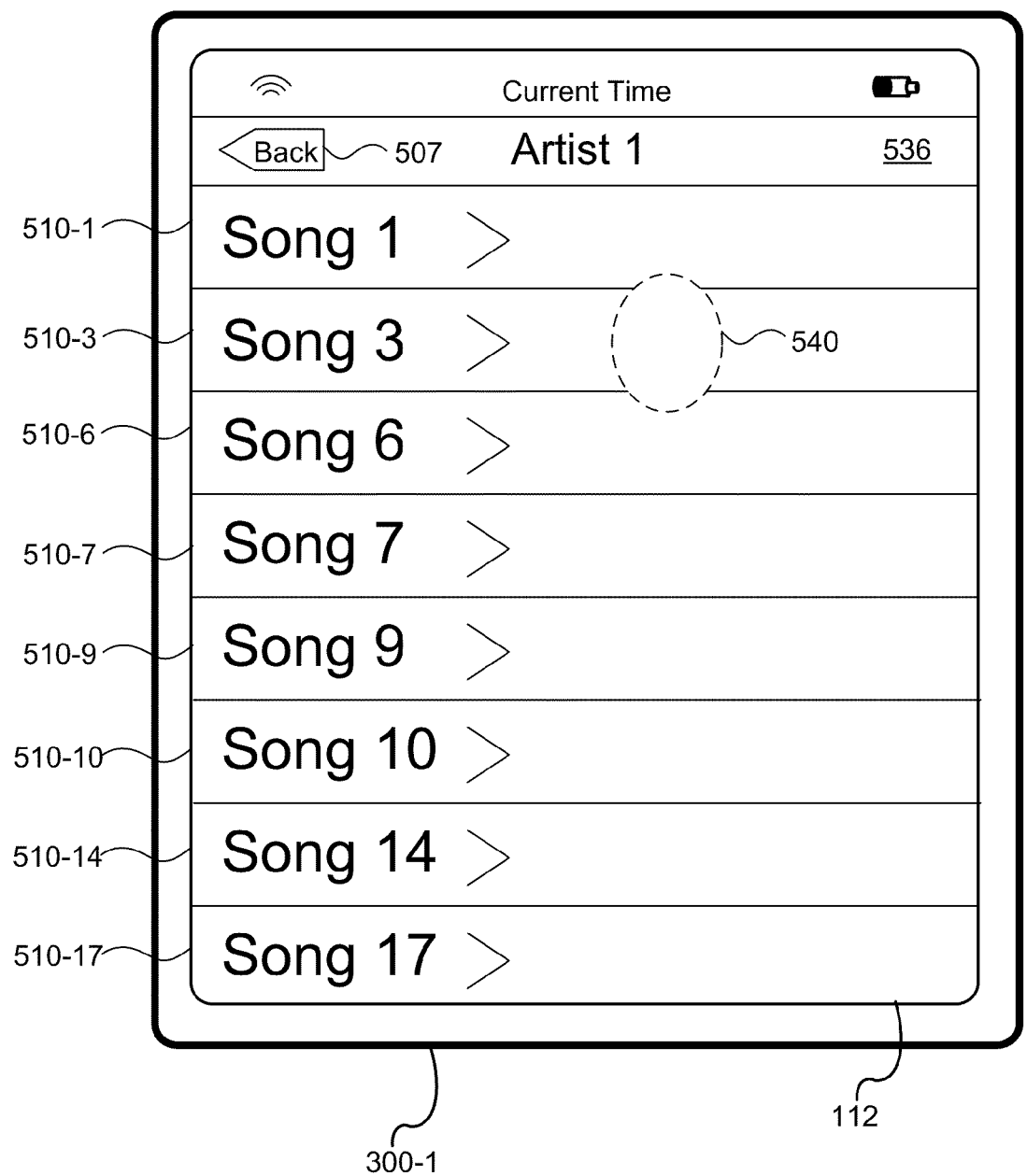
Figure 5I:
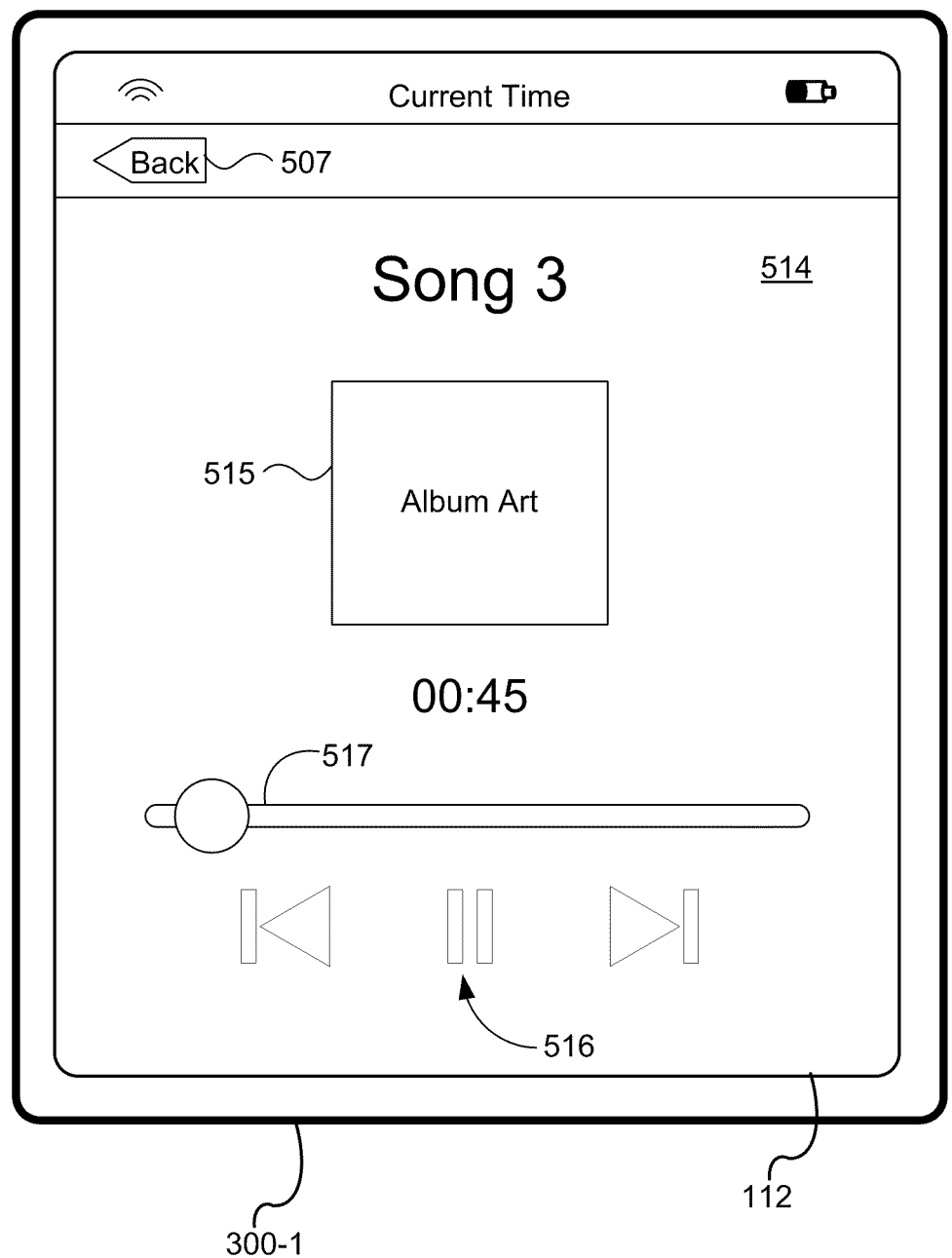
Figure 5J:
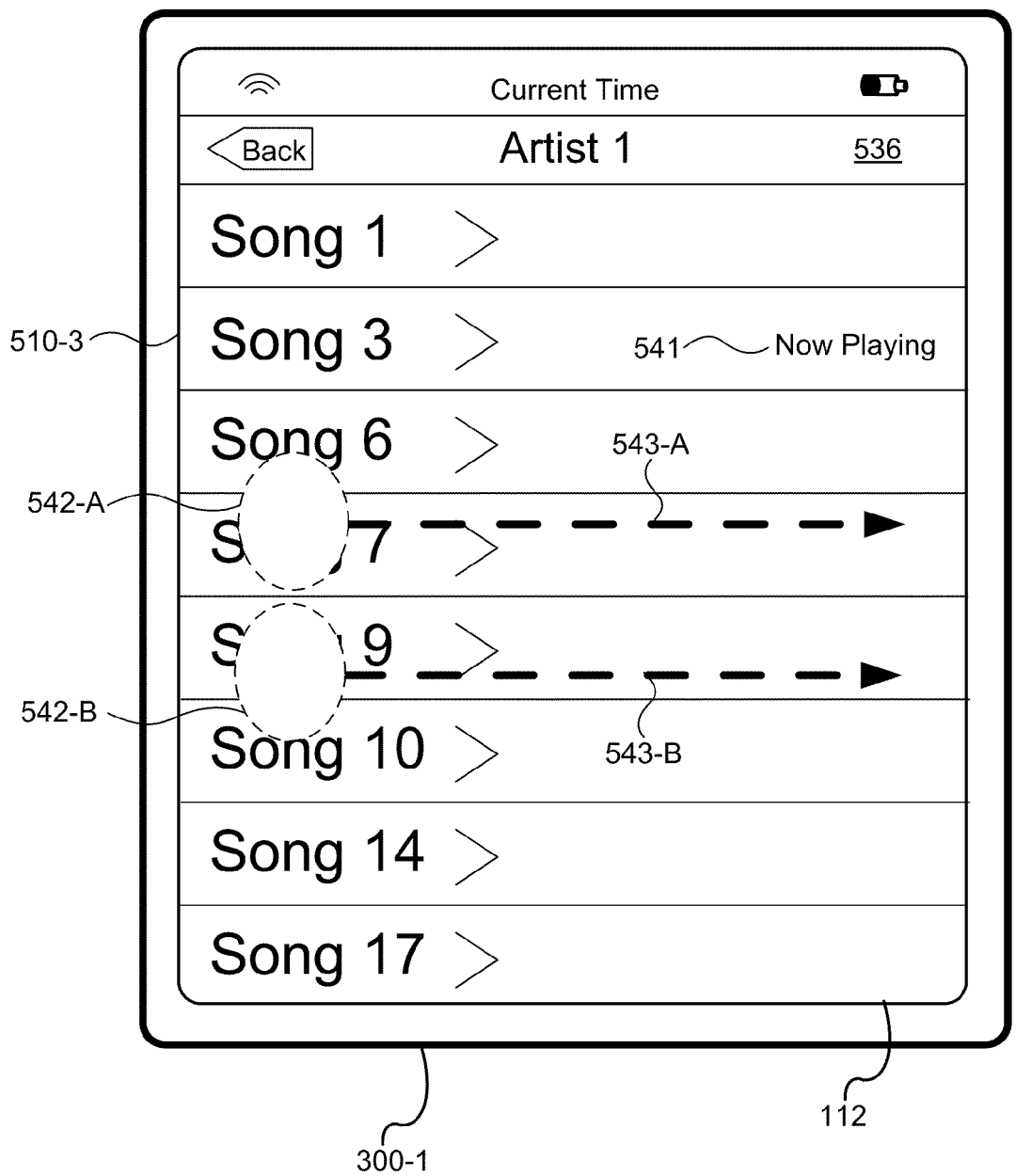
Figure 5K:
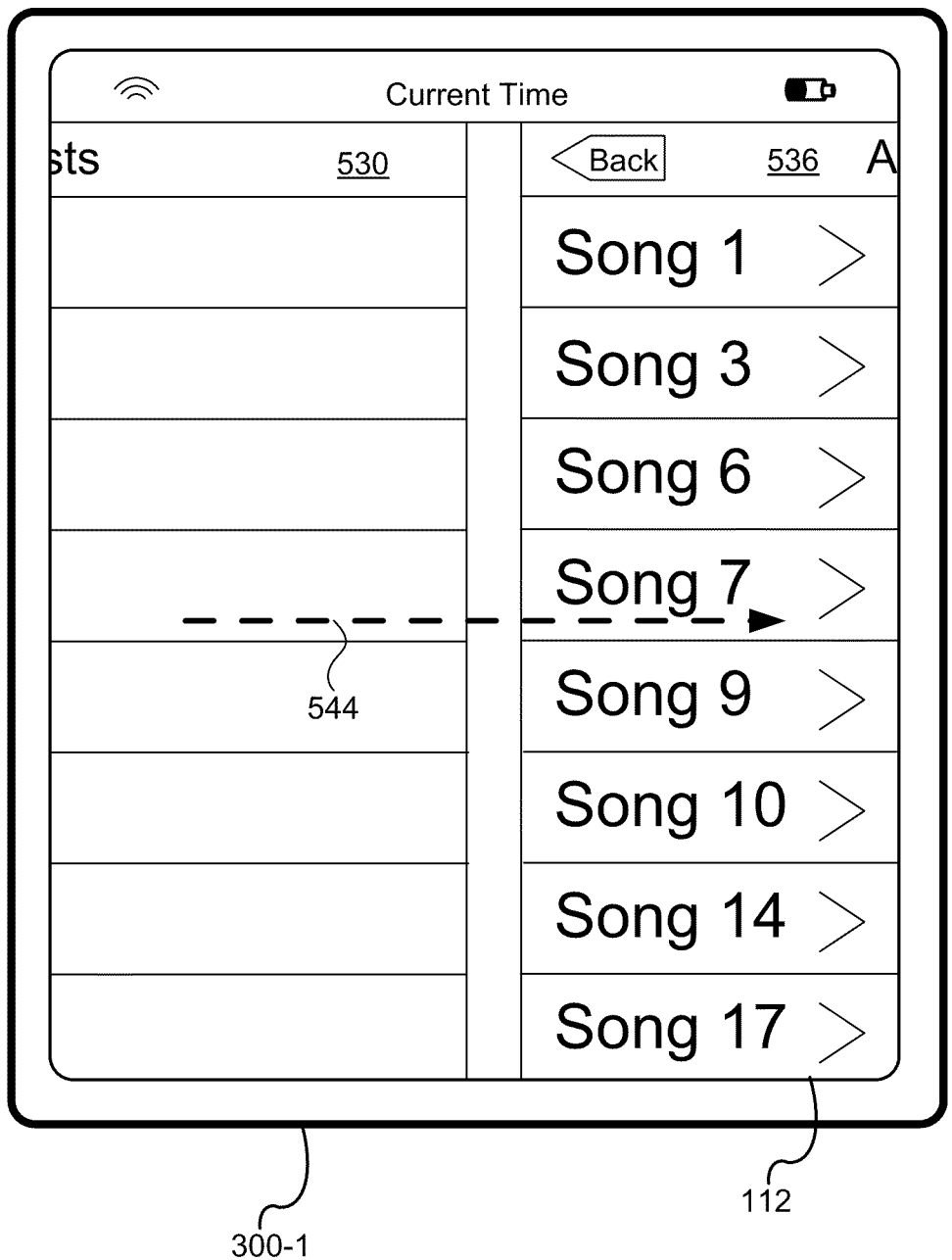
Figure 5L:
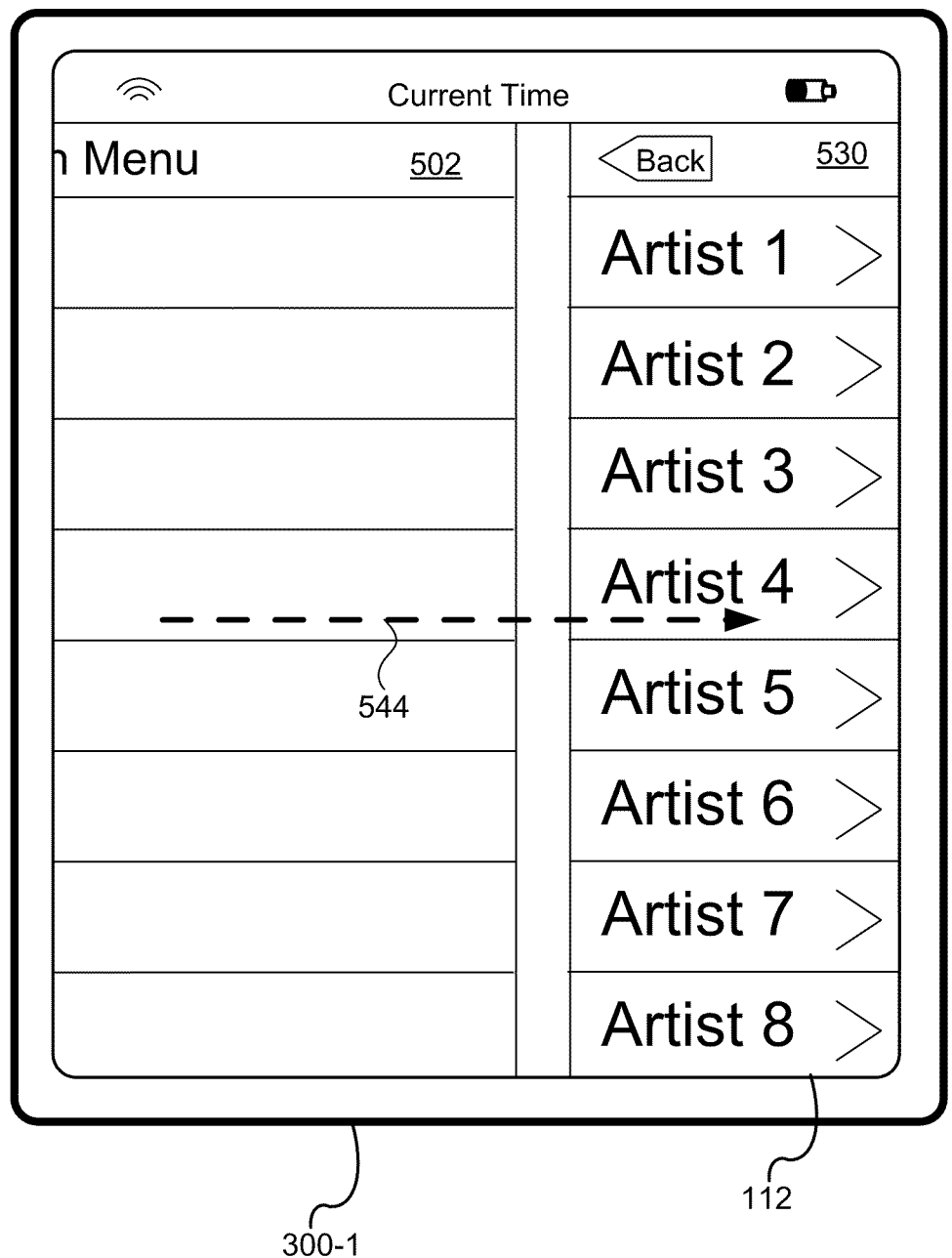
Figure 5M:
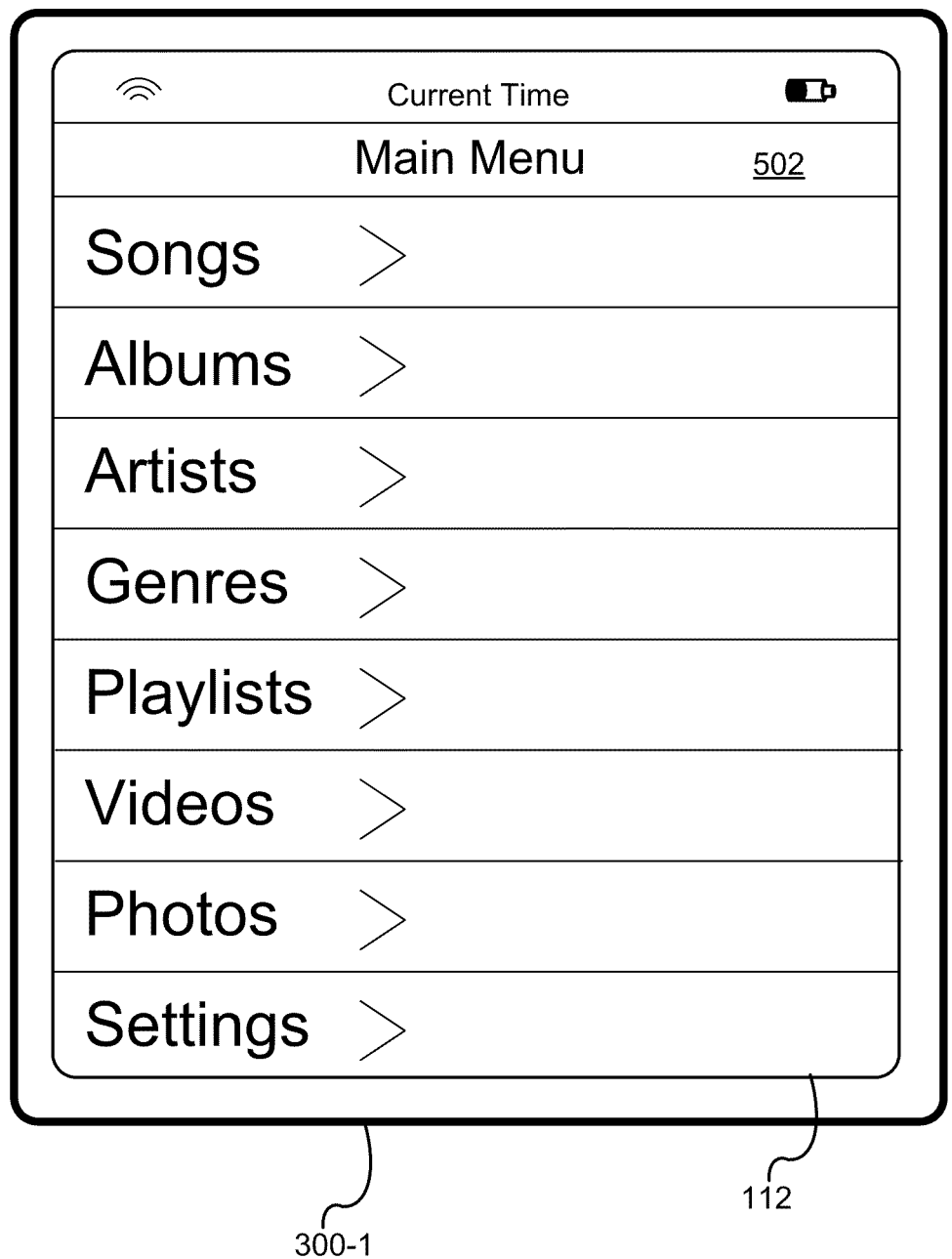
Figure 5N:
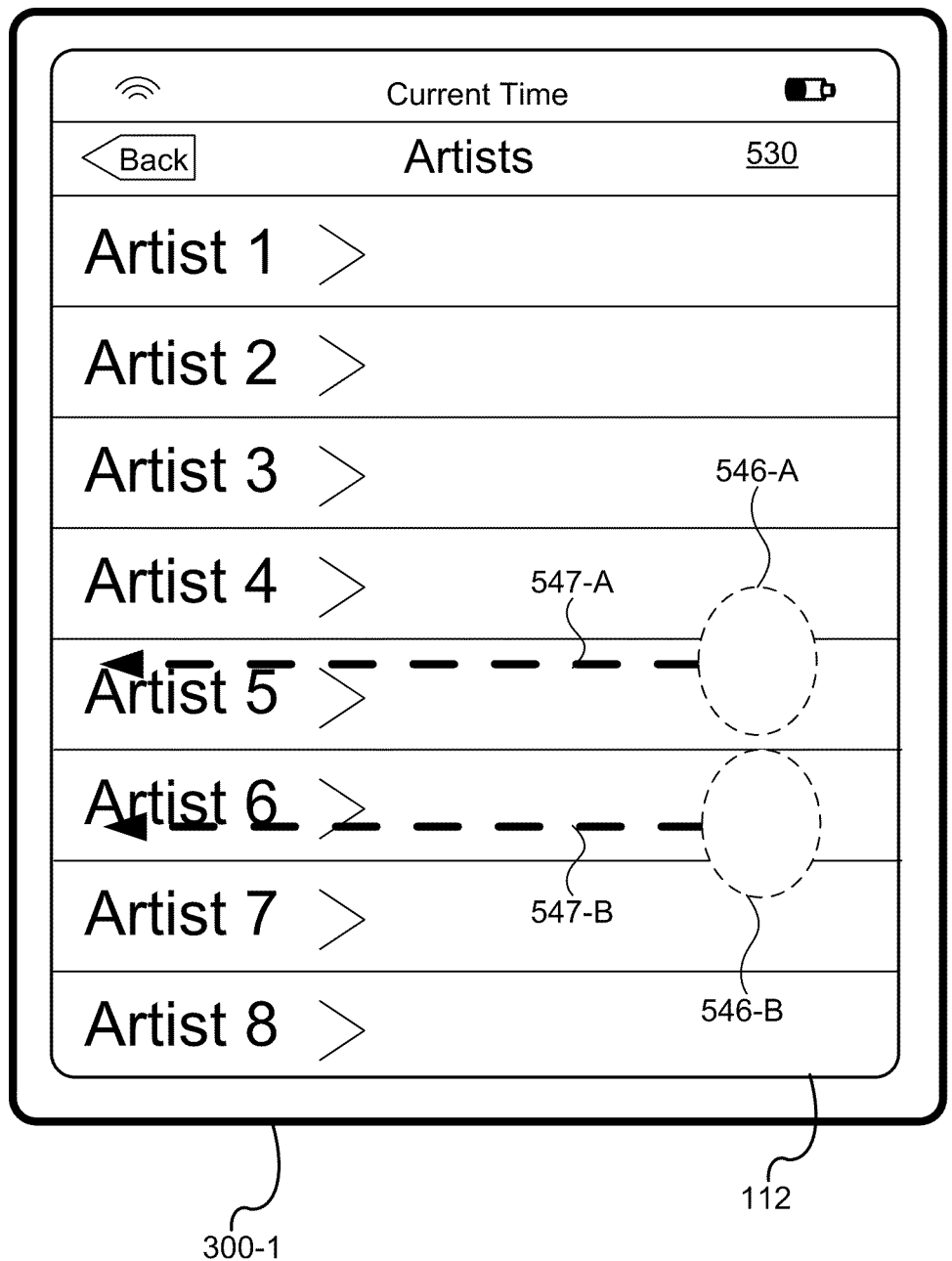
Figure 5O:
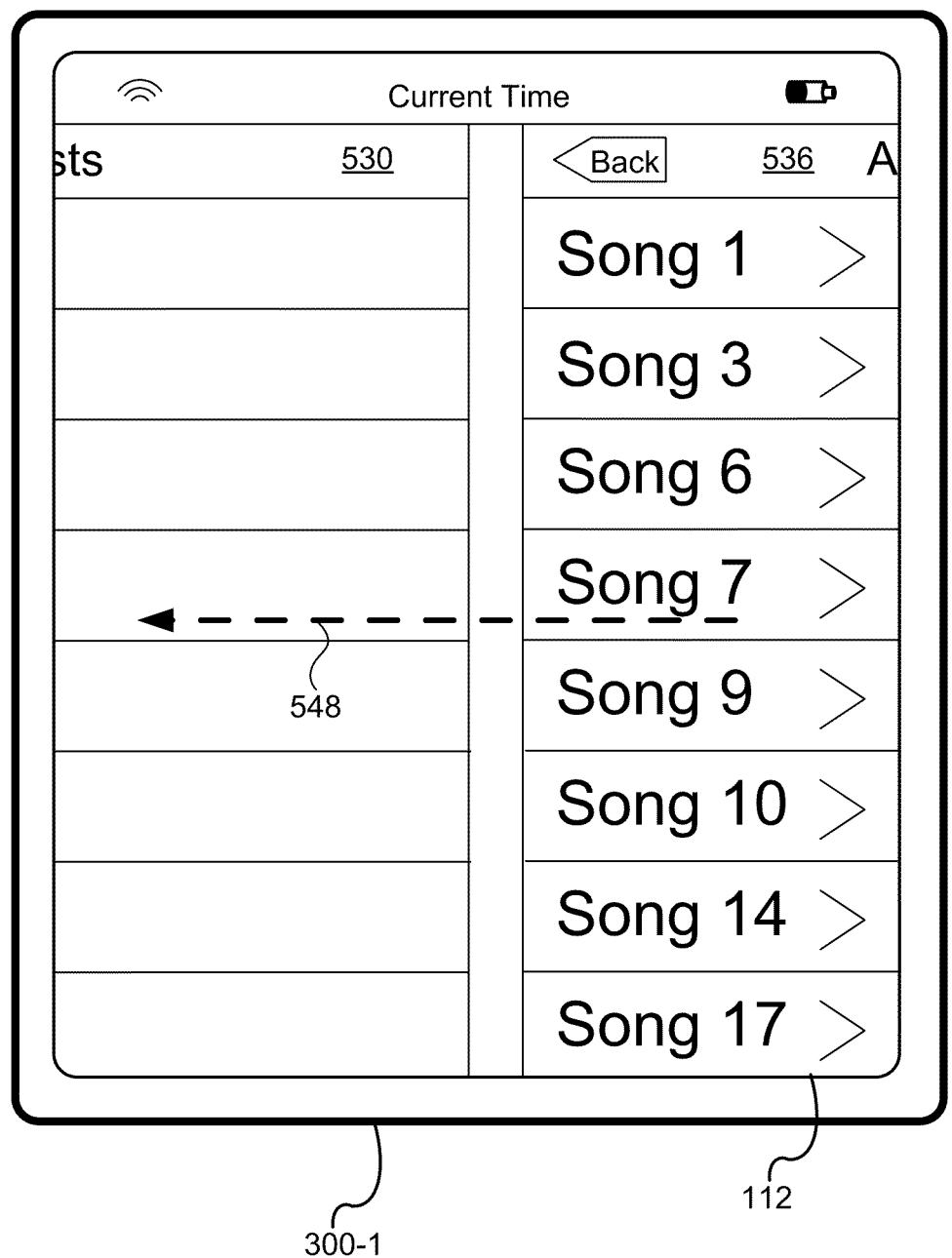
Figure 5P:
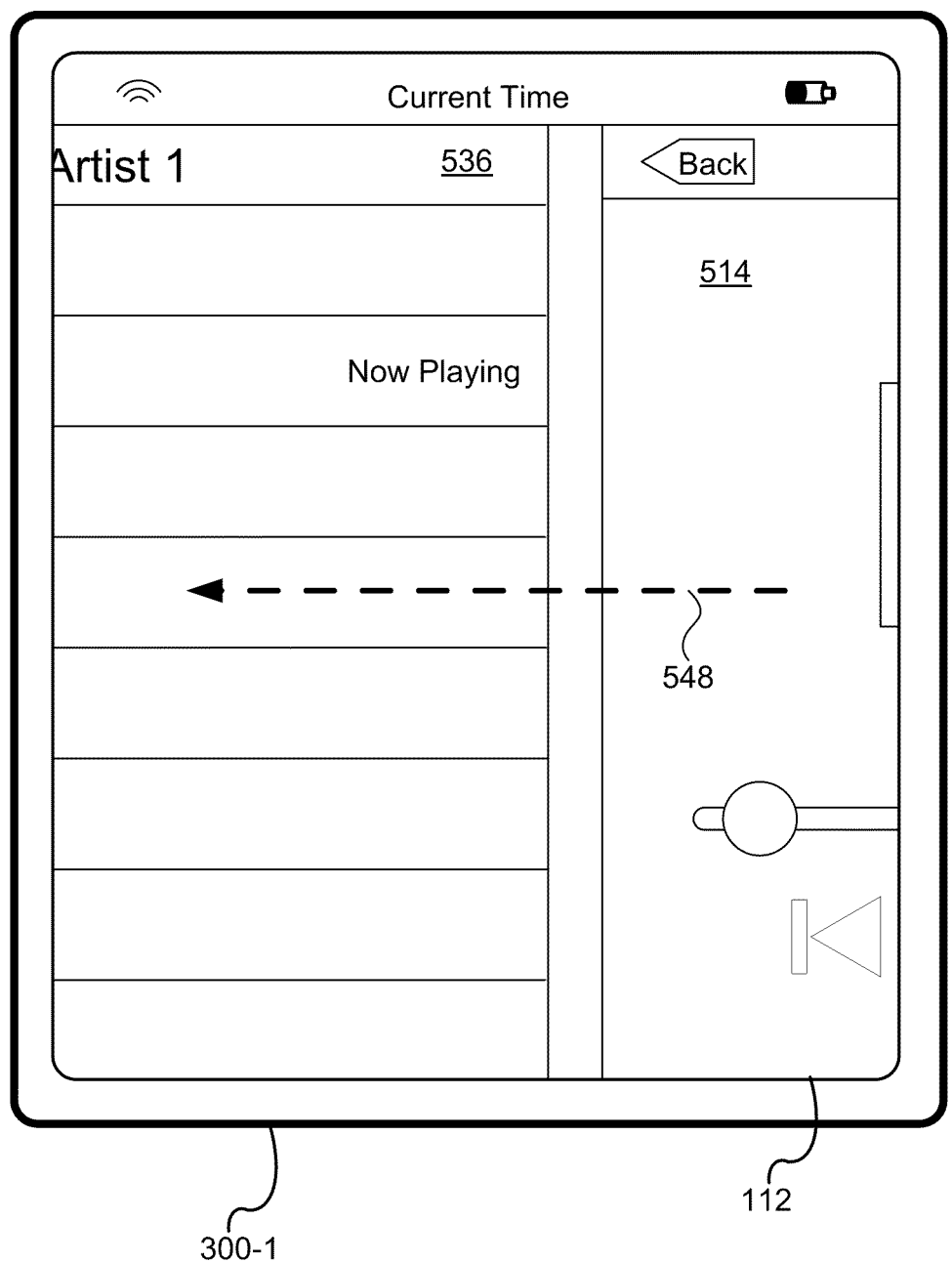
Figure 5Q:
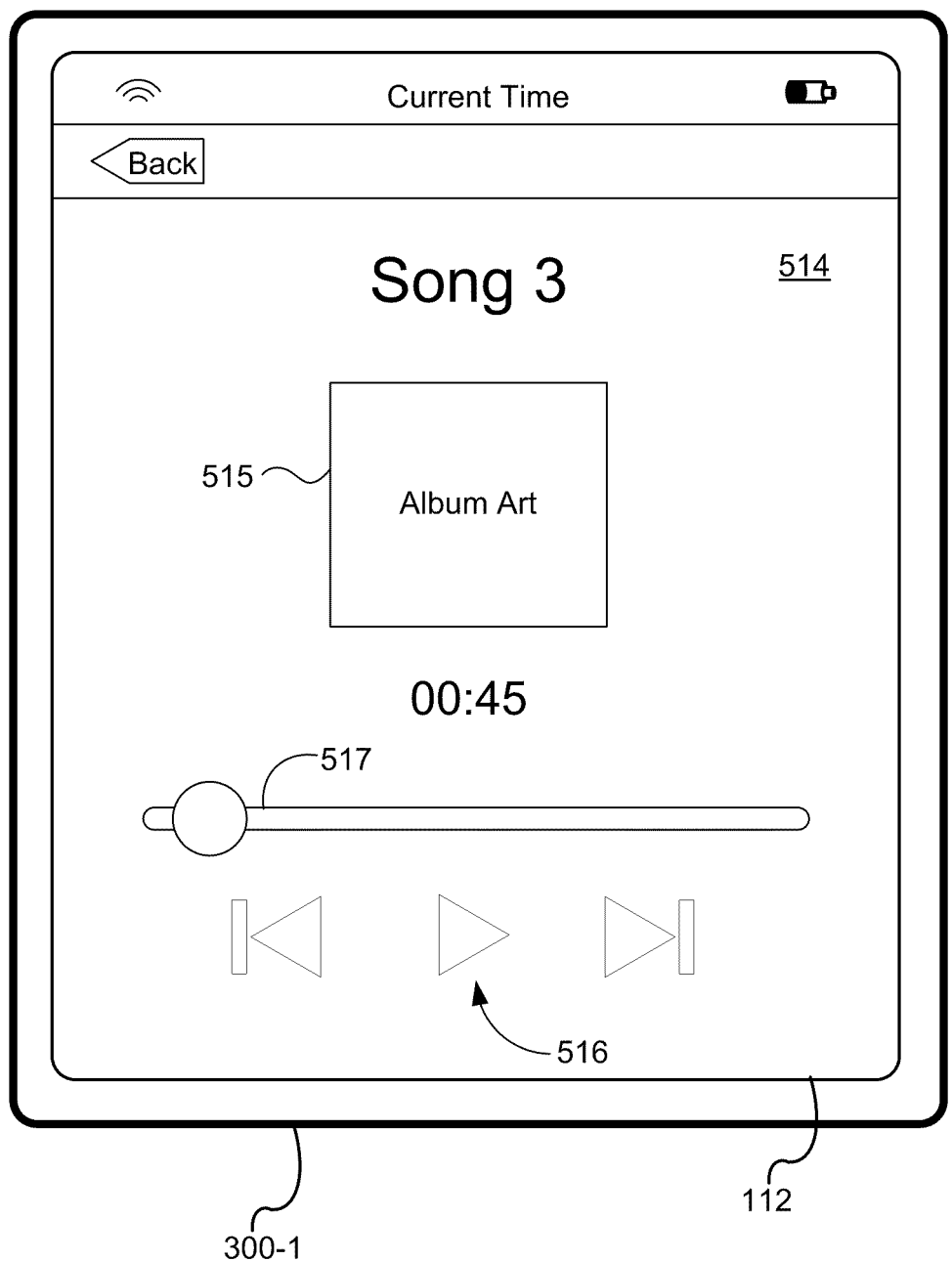
Figure 5R:
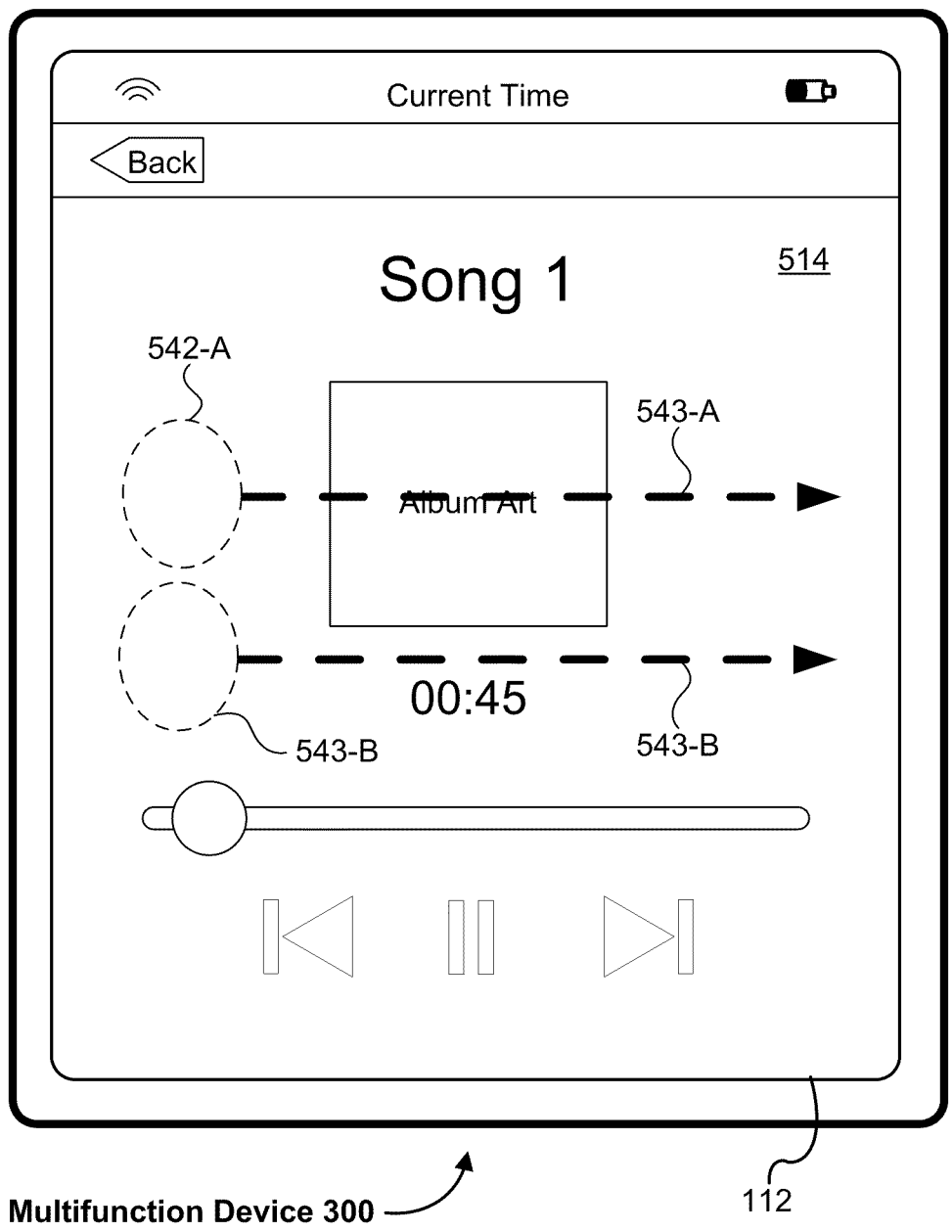
Figure 5S:
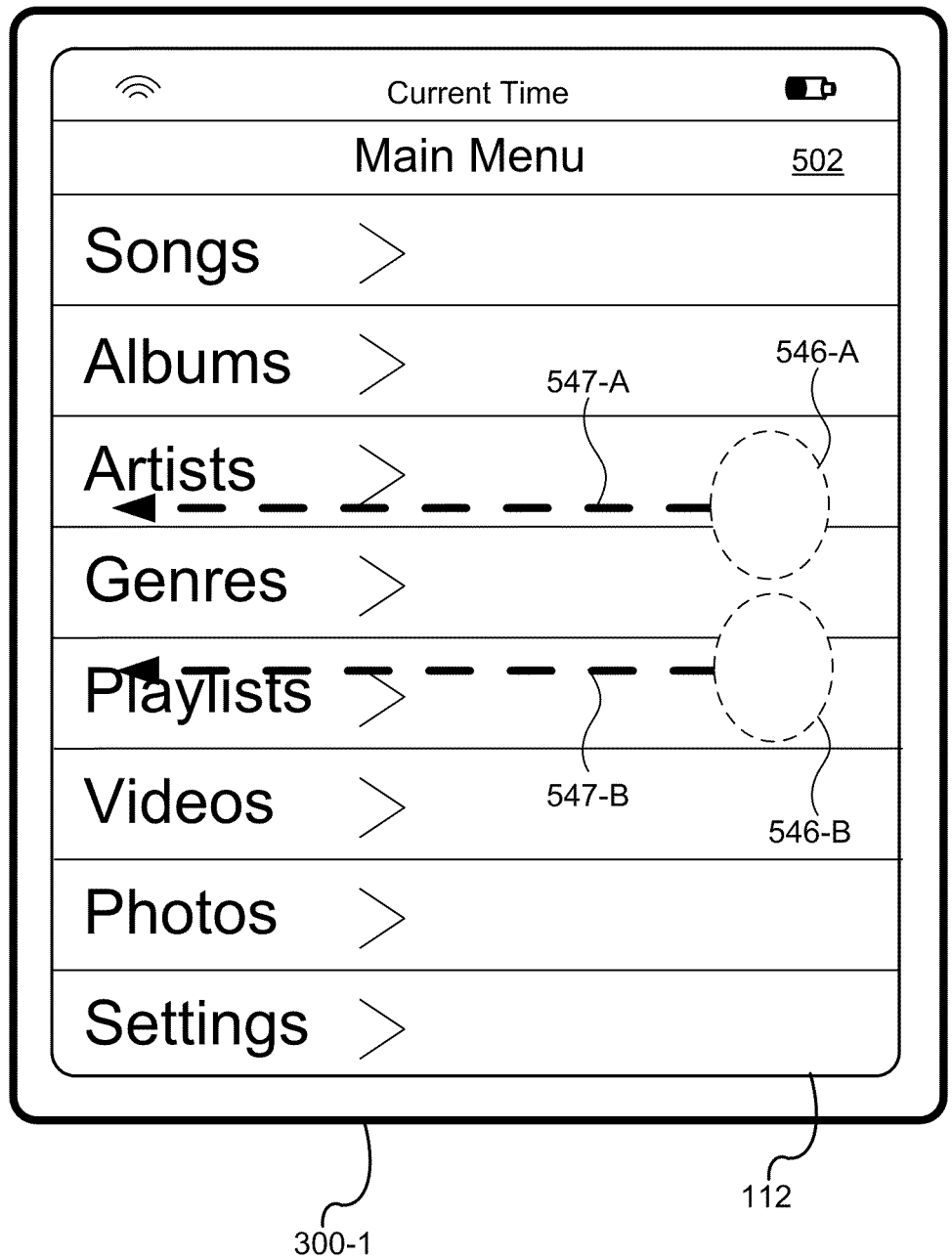
Figure 6A:
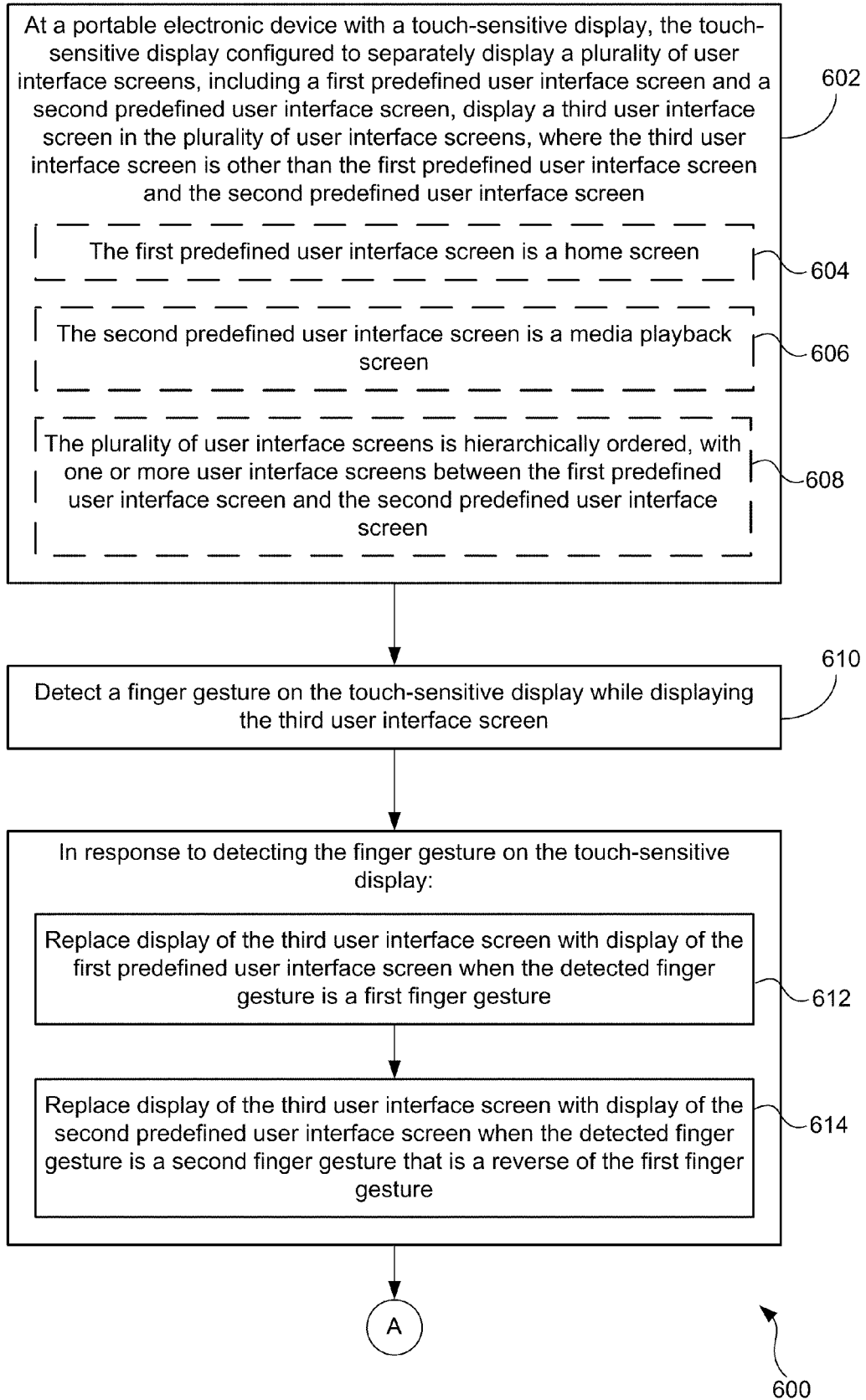
FIGS. 6A-6D are flow diagrams illustrating a method of navigating between user interface screens in accordance with some embodiments.
Figure 6B:
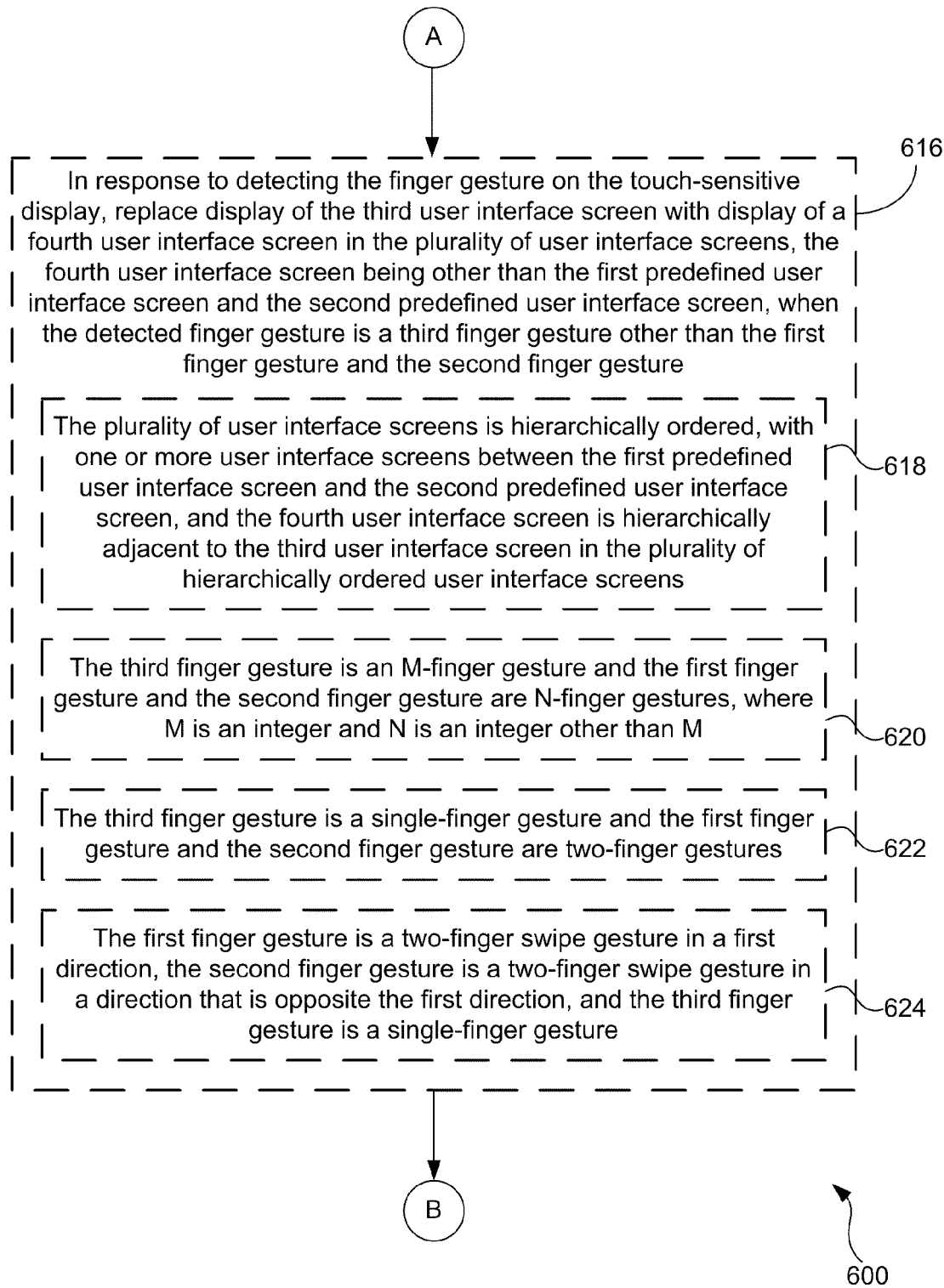
Figure 6C:
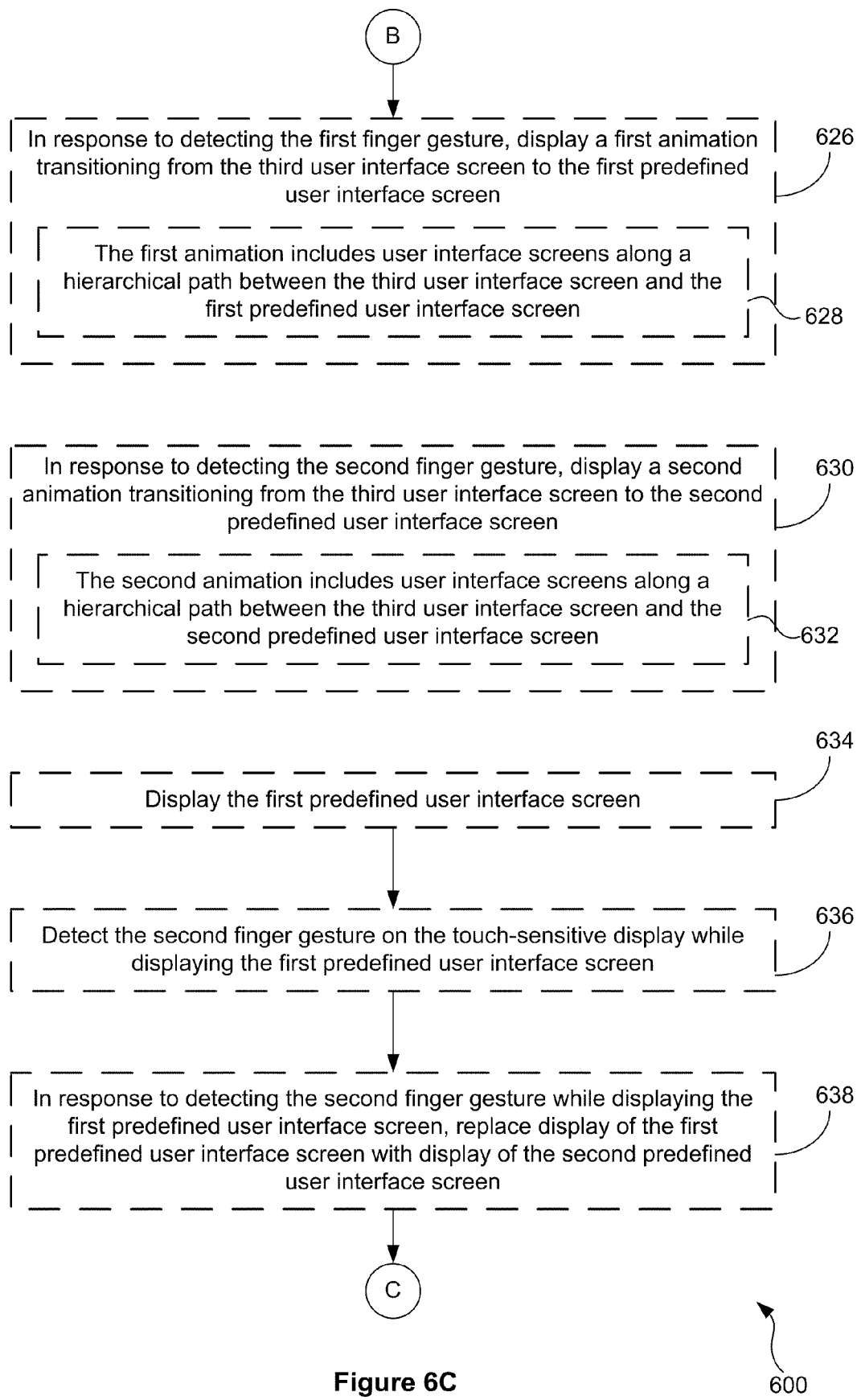
Figure 6D:
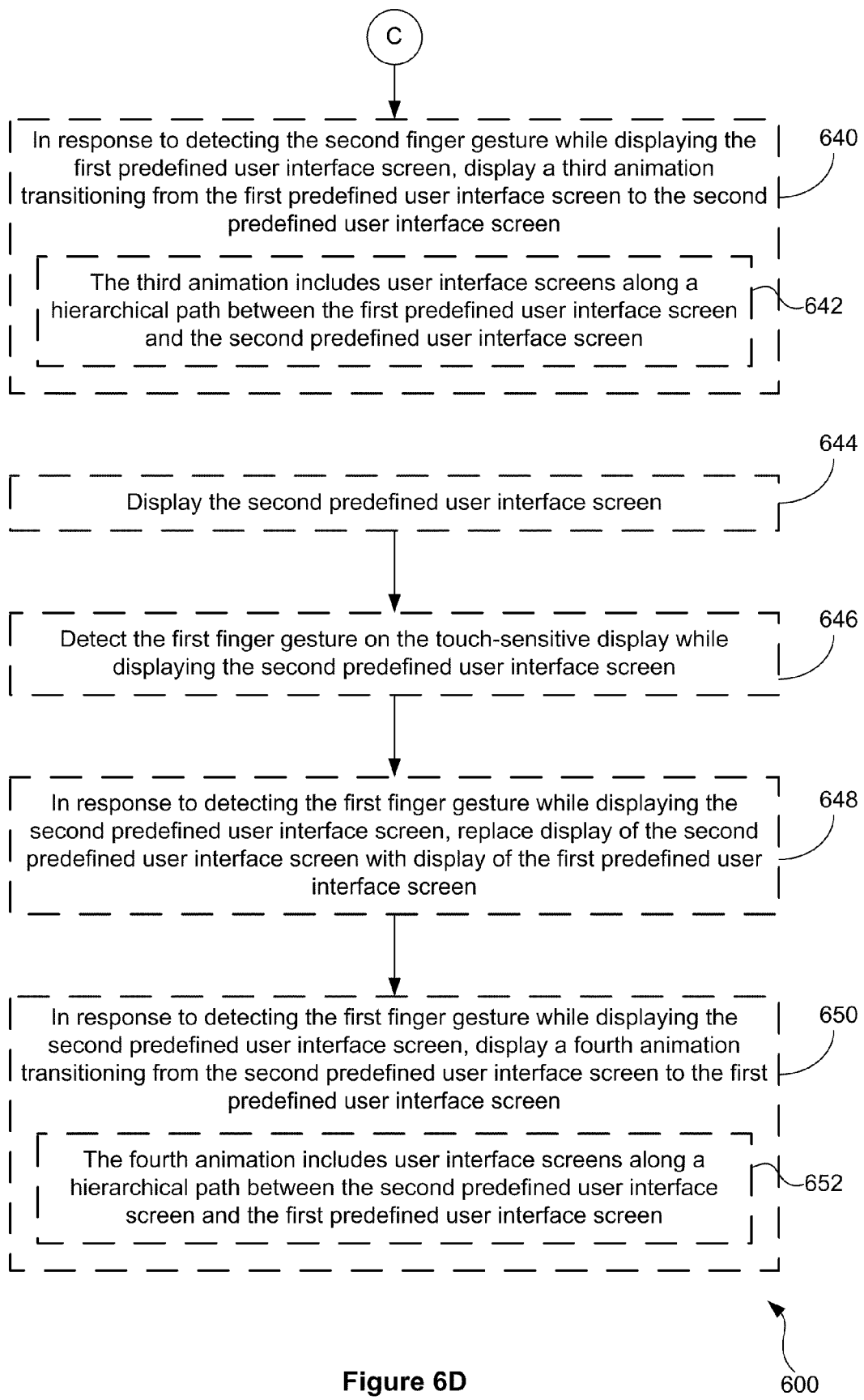

FIGS. 5A-5S illustrate exemplary user interface screens that are navigable in accordance with some embodiments. The user interfaces in these figures are used to illustrate the processes described below, including the processes in FIGS. 6A-6D. It should be appreciated that FIGS. 5A-5S are not drawn to scale.

FIG. 5A depicts a main menu screen 502 displayed on touch screen 112 of device 300-1. Main menu screen 502 corresponds to a main, home, or root menu of device 300-1. Main menu screen 502 includes one or more links (or other user interface objects, such as buttons, icons, etc.) 504 for navigation to user interface screens associated with applications and/or functions on device 300-1. For example, the links 504 include Songs link 504-1, Albums link 504-2, Artists link 504-3, Genres link 504-4, Playlists link 504-5, Videos link 504-6, Photos link 504-7, and Settings link 504-8. When a link 504 is selected by a user (e.g., by the user performing a gesture on the link 504), a user interface screen corresponding to the selected link is displayed in place of main menu screen 502. Other links that may be included include, without limitation, a Podcasts link, an FM radio link, and a Games link, to name a few examples.

FIG. 5A also depicts a detected gesture 506 (e.g., a tap gesture) on Songs link 504-1; Songs link 504-1 is selected. In response to detection of gesture 506 on Songs link 504-1, device 300-1 displays songs listing screen 508 in place of main menu screen 502, as shown in FIG. 5B; the device 300-1 navigates from main menu screen 502 to songs listing screen 508. Songs listing screen 508 lists one or more links 510 for playing back audio files (e.g., songs) that are stored in device 300-1. For example, in FIG. 5B, songs listing screen 508 includes Song 1 link 510-1, Song 2 link 510-2, Song 3 link 510-3, and so on. Audio files stored in device 300-1 may be grouped into one or more of albums, artists, genres, playlists, or podcast shows. In some embodiments, audio files are grouped into albums, artists, etc. based on metadata (e.g., artist metadata, album metadata, etc.) associated with the audio file. Also displayed with songs listing screen 508 is "Back" button 507 for navigating to the immediately preceding user interface screen in response to a gesture (e.g., a tap gesture) detected on Back button 507.

When a song link 510 is selected, playback of the audio file corresponding to the selected song link 510 is activated and a media playback screen is displayed. FIG. 5B illustrates a detected gesture 512 (e.g., a tap gesture) on Song 1 link 510-1; Song 1 link 510-1 is selected. In response to detection of gesture 512 on Song 1 link 510-1, playback of Song 1 is activated and media playback screen 514 is displayed for playback of Song 1, as shown in FIG. 5C. The media playback screen 514 may include information about the audio file being played back (Song 1 in FIG. 5C), the playback time position in the song, album art 515, if available, for Song 1, playback controls 516 (e.g., play/pause button(s), next/previous track buttons, etc.), and progress bar and scrubber 517. Also displayed with media playback screen 514 is Back button 507 for navigating to the immediately preceding user interface screen in response to a gesture (e.g., a tap gesture) detected on Back button 507.

If, in FIG. 5A, a gesture (e.g., a tap gesture) was detected on Albums link 504-2 instead of Songs link 504-1 (i.e., Albums link 504-2 in main menu screen 502 was selected), albums listing screen 518 is displayed in response, as shown in FIG. 5D; the device 300-1 navigates from main menu screen 502 to albums listing screen 518. Albums listing screen 518 lists links 520 to one or more albums with which audio files stored in device 300-1 are associated (e.g., based on metadata associated with the audio files). For example, in FIG. 5D, links 520-1 thru 520-8 to Albums 1 thru 8 are shown. More or less album links, as well as a "miscellaneous" link or the like for audio files not associated with an album, may be displayed depending on the albums with which audio files in device 300-1 are associated. Back button 507 is also displayed in albums listings screen 518.

When an album link 520 is selected, links to one or more songs in the corresponding album are displayed. For example, in FIG. 5D, gesture 522 (e.g., a tap gesture) is detected on Album 2 link 520-2. In response to detection of gesture 522 on Album 2 link 520-2, Album 2 screen 524 is displayed, as shown in FIG. 5E. Displayed in Album 2 screen 524 are links 510 to audio files that are associated with Album 2. Thus, for example, Album 2 is associated with Songs 1, 4, 5, 8, 9, 10, 14, and 17; song links 510-1, 510-4, 510-5, 510-8, 510-9, 510-10, 510-14, and 510-17, corresponding to Songs 1, 4, 5, 8, 9, 10, 14, and 17, respectively, are displayed in Album 2 screen 524. Also displayed with Album 2 screen 524 is "Back" button 507 for navigating to the immediately preceding user interface screen (in this case, albums listing screen 518) in response to detecting a gesture (e.g., a tap gesture) on Back button 507. A song link 510 may be selected to activate playback of the corresponding audio file. For example, gesture 528 is detected on Song 4 link 510-4. In response to detection of gesture 528, media playback screen 514 is displayed for playback of Song 4, as shown in FIG. 5F. The media playback screen 514 for Song 4 may include album art 515, if available, for Song 4, playback controls 516, progress bar and scrubber 517, and Back button 507.

If, in FIG. 5A, a gesture (e.g., a tap gesture) was detected on Artists link 504-3 instead of Songs link 504-1 (i.e., Artists link 504-3 in main menu screen 502 was selected), artists listing screen 530 is displayed in response, as shown in FIG. 5G; the device 300-1 navigates from main menu screen 502 to artists listing screen 530. Artists listing screen 530 lists links 532 to one or more artists with which audio files stored in device 300-1 are associated (e.g., based on metadata associated with the audio files). For example, in FIG. 5G, links 532-1 thru 532-8 to Artists 1 thru 8 are shown. More or less artist links, as well as a "miscellaneous" link or the like for audio files not associated with an artist, may be displayed depending on the artists with whom audio files in device 300-1 are associated. Back button 507 is also displayed in albums listings screen 530.

When an artist link 532 is selected, links to one or more songs by the corresponding artist are displayed. For example, in FIG. 5G, gesture 534 (e.g., a tap gesture) is detected on Artist 1 link 532-1. In response to detection of gesture 534 on Artist 1 link 532-1, Artist 1 screen 536 is displayed, as shown in FIG. 5H. Displayed in Artist 1 screen 536 are links 510 to audio files that are associated with Artist 1. Thus, for example, Artist 1 is associated with Songs 1, 3, 6, 7, 9, 10, 14, and 17; song links 510-1, 510-3, 510-6, 510-7, 510-9, 510-10, 510-14, and 510-17, corresponding to Songs 1, 3, 6, 7, 9, 10, 14, and 17, respectively, are displayed in Artist 1 screen 536. Also displayed with Artist 1 screen 536 is "Back" button 507 for navigating to the immediately preceding user interface screen (in this case, artists listing screen 530) in response to a gesture (e.g., a tap gesture) detected on Back button 507. A song link 510 may be selected to activate playback of the corresponding audio file. For example, gesture 540 is detected on Song 3 link 510-3. In response to detection of gesture 540, media playback screen 514 is displayed for playback of Song 3, as shown in FIG. 5I. The media playback screen 514 for Song 3 may include album art 515, if available, for Song 3, playback controls 516, progress bar and scrubber 517, and Back button 507.

It should be appreciated that user interface screens displayed and the navigation of those user interface screens when following Genres link 504-4, Playlists link 504-5, Videos link 504-6 (for video files) Photos link 504-7 (for images) and podcasts link (not shown) are analogous to those described above in reference to FIGS. 5A-5I. Similarly, Settings link 504-8 leads to user interface screens organized by sub-category of settings, for configuring device 300-1.

While Song 3 is played back, as in FIG. 5I, Back button 507 may be selected to navigate back to Artist 1 screen 536 while Song 3 remains playing, as shown in FIG. 5J. A "Now playing" label 541 is displayed with Song 3 link 510-3 to remind the user that playback of Song 3 is ongoing.

FIG. 5J also depicts gesture 542 being detected on touch screen 112. Gesture 542 is a two-finger gesture; gesture 542 has two concurrent finger contacts 542-A and 542-B and includes movements 543-A and 543-B of finger contacts 542-A and 542-B in the horizontal direction, respectively, in a swipe or drag gesture. In response to detection of gesture 542, an animation of user interface screens sliding out of view and into view is displayed. The user interface screens shown sliding out of and into view in the animation may include user interface screens that are between Artist 1 screen 536 and main menu screen 502, inclusive, in a navigational sequence of user interface screens from Artist 1 screen 536 to main menu screen 502.

For example, the animation may include Artist 1 screen 536 sliding out of view, in the horizontal direction indicated by arrow 544 and artists listing screen 530 sliding into view, as shown in FIG. 5K. The animation continues with artists listing screen 530 sliding out of view and main menu screen 502 sliding into view in direction 544, as shown in FIG. 5L. The animation completes with main menu screen 502 sliding completely into view and being displayed on touch screen 112, as shown in FIG. 5M. Thus, in response to detection of gesture 542, device 300-1 displays main menu screen 502 in place of Artist 1 screen 536 and may display an animation that shows user interface screens that were bypassed (e.g., artists listing screen 530) in transitioning from Artist 1 screen 536 to main menu screen 502 to provide context for the user.

While Song 3 is played back (or paused), as in FIG. 5I, Back button 507 may be selected to navigate back to Artist 1 screen 536 while Song 3 remains playing (or paused), as shown in FIG. 5J. In some embodiments, a "Now playing" label 541 is displayed with Song 3 link 510-3 to remind the user that playback of Song 3 is ongoing. Back button 507 on Artist 1 screen 536 may be selected to navigate back from Artist 1 screen 536 to artists listing screen 530 while Song 3 remains playing (or paused), as shown in FIG. 5N.

FIG. 5N also depicts gesture 546 being detected on touch screen 112. Gesture 546 is a two-finger gesture; gesture 546 has two concurrent finger contacts 546-A and 546-B and includes horizontal movements 547-A and 547-B of finger contacts 546-A and 546-B, respectively, in a swipe or drag gesture. It should be appreciated that gesture 546 is the reverse of gesture 542; movements 543 and 547 are opposites of each other. In response to detection of gesture 546, an animation of user interface screens sliding out of view and into view is displayed. The user interface screens shown sliding out of and into view in the animation may include user interface screens that are between artists listing screen 530 and media playback screen 514 for Song 3, inclusive, in a navigational sequence of user interface screens from artists listing screen 530 to media playback screen 514 for Song 3.

For example, the animation may include artists listing screen 530 sliding out of view, in the direction indicated by arrow 548 and Artist 1 screen 536 sliding into view, as shown in FIG. 5O. The animation continues with Artist 1 screen 536 sliding out of view and media playback screen 514 for Song 3 sliding into view in direction 548, as shown in FIG. 5P. The animation completes with media playback screen 514 for Song 3 sliding completely into view and being displayed on touch screen 112, as shown in FIG. 5Q. Thus, in response to detection of gesture 546, device 300-1 displays media playback screen 514 for Song 3 in place of artists listing screen 530 and may display an animation that shows user interface screens that were bypassed (e.g., Artist 1 screen 536) in transitioning from artists listing screen 530 to media playback screen 514 for Song 3.

In the examples described above, two-finger gestures 542 and 546 activate navigation to main menu screen 502 or media playback screen 514, respectively, regardless of the number of user interface screens that are between the current screen and menu screen 502 or media playback screen 514, respectively. Main menu screen 502 is predefined as the user interface screen to which the device navigates in response to detecting gesture 542. Similarly, media playback screen 514 is predefined as the user interface screen to which the device navigates in response to detecting gesture 546, with gesture 546 being the reverse of gesture 542. In some embodiments, if the detected gesture was instead a one-finger gesture (e.g., a swipe or drag gesture but with just one finger contact), then navigation by one user interface screen is activated instead. Thus, for example, in FIG. 5J, if the detected gesture is a gesture that is like gesture 542 except that it is a single-finger gesture instead of a two-finger gesture, then artists listing screen 530 is displayed. The animation depicted in FIG. 5K may be displayed, but the animation stops with artists listing screen 530 being displayed, rather than continuing to show additional user interface screens sliding out of and into view. As another example, in FIG. 5N, if the detected gesture is a gesture that is like gesture 546 except that it is a single-finger gesture on Artist 1 532-1 instead of a two-finger gesture, then Artist 1 screen 536 is displayed. The animation depicted in FIG. 5O may be displayed, but the animation stops with Artist 1 screen 536 being displayed, rather than continuing to show additional user interface screens sliding out of and into view.

Thus, the one-finger gestures serve to activate navigation by one user interface screen backward or forward, while two-finger gesture 542 and its reverse gesture (two-finger gesture 546) serve to activate navigation to respective predefined user interface screens (e.g., main menu screen 502 and media playback screen 514, respectively).

It should be appreciated that while the example above describes two-finger gestures as activating navigation to predefined user interface screens (e.g., main menu screen 502, media playback screen 514) and the one-finger gestures as activating navigation by one user interface screen at a time (e.g., to an immediately preceding or succeeding user interface screen), in some embodiments, the two-finger gestures activate navigation by one user interface screen at a time and the one-finger gestures activate navigation to predefined user interface screens. In some other embodiments, the number of fingers in a gesture for activating navigation to predefined user interface screens is an integer other than one or two, such as three or four. Further, in some embodiments, the location on touch screen 112 where the two-finger gesture is detected is irrelevant. Thus, for example, in FIG. 5J, gesture 542 may be performed in the upper portion, middle portion, or lower portion of touch screen 112 and the result is the same; main menu screen 502, along with an animation showing the transition to main menu screen 502, is displayed.

FIG. 5R depicts media playback screen 514 for Song 1 displayed on touch screen 112; playback of Song 1 is ongoing (or paused) on device 300-1. Media playback screen 514 for Song 1 may be displayed as a result of, for example, navigation from main menu screen 502 to songs listing screen 508 to media playback screen 514, as depicted in FIGS. 5A-5C. As another example, media playback screen 514 for Song 1 may be displayed as a result of navigation from main menu screen 502 to albums listing screen 518 to Album 2 screen 524, as shown in FIGS. 5A, 5D-5E, and selection of Song 1 link 510-1 in Album 2 screen 524. As a further example, media playback screen 514 for Song 1 may be displayed as a result of navigation from main menu screen 502 to artists listing screen 530 to Artist 1 screen 536, as shown in FIGS. 5A, 5G-5H, and selection of Song 1 link 510-1 in Artist 1 screen 536.

FIG. 5R also depicts detection of finger gesture 542 on touch screen 112. In response to detection of gesture 542, an animation analogous to that depicted in FIGS. 5K-5M is displayed; user interface screens between media playback screen 514 and main menu screen 502 are animated as sliding out of and into view in sequence, concluding with main menu screen 502 being displayed, as in FIG. 5M. In some embodiments, the user interface screens that are displayed in the animation depends on the user interface screens through which navigation occurred to reach media playback screen 514 from main menu screen 502, thereby providing context to the user.

FIG. 5S depicts main menu screen 502 displayed on touch screen 112 while playback of a song (e.g., Song 1, etc.) is ongoing. Main menu screen 502 may be displayed while a song (e.g., Song 1) is playing as a result of, for example, navigation from main menu screen 502 to songs listing screen 508 to media playback screen 514, as depicted in FIGS. 5A-5C, and then the user navigates back to song listing screen 508 and then to main menu screen 502 (e.g., by using Back button 507) while playback is active. As another example, media playback screen 514 may be displayed as a result of navigation from main menu screen 502 to albums listing screen 518 to Album 2 screen 524, as shown in FIGS. 5A, 5D-5E, and selection of a song link 510 in Album 2 screen 524, and then navigating back to main menu screen 502 (through one or more user interface screens in between) while playback is active. As a further example, media playback screen 514 for Song 1 may be displayed as a result of navigation from main menu screen 502 to artists listing screen 530 to Artist 1 screen 536, as shown in FIGS. 5A, 5G-5H, and selection of a song link 510 in Artist 1 screen 536, and then navigating back to main menu screen 502 (through one or more user interface screens in between) while playback is active.

FIG. 5S also depicts detection of finger gesture 546 on touch screen 112. In response to detection of gesture 546, an animation analogous to that depicted in FIGS. 5O-5Q is displayed; user interface screens between main menu screen 502 and media playback screen 514 are animated as sliding out of and into view in sequence, concluding with media playback screen 514 being displayed, as in FIG. 5Q. In some embodiments, the user interface screens that are displayed in the animation depends on the user interface screens through which navigation occurred to reach media playback screen 514 from main menu screen 502.

In some embodiments, main menu screen 502, media playback screen(s) 514, and other user interface screens described above in reference to FIGS. 5A-5S are parts of a navigational hierarchy (e.g., as in a tree data structure) of user interface screens on device 300-1. Main menu screen 502 is at the root or top level of the hierarchy, and other user interface screens on device 300-1 are navigable from main menu screen 502 through links in main menu screen 502 (e.g., links 510) and links in user interface screens further down in the hierarchy (e.g., song links 510, album links 520, artist links 532).

Figure 7:
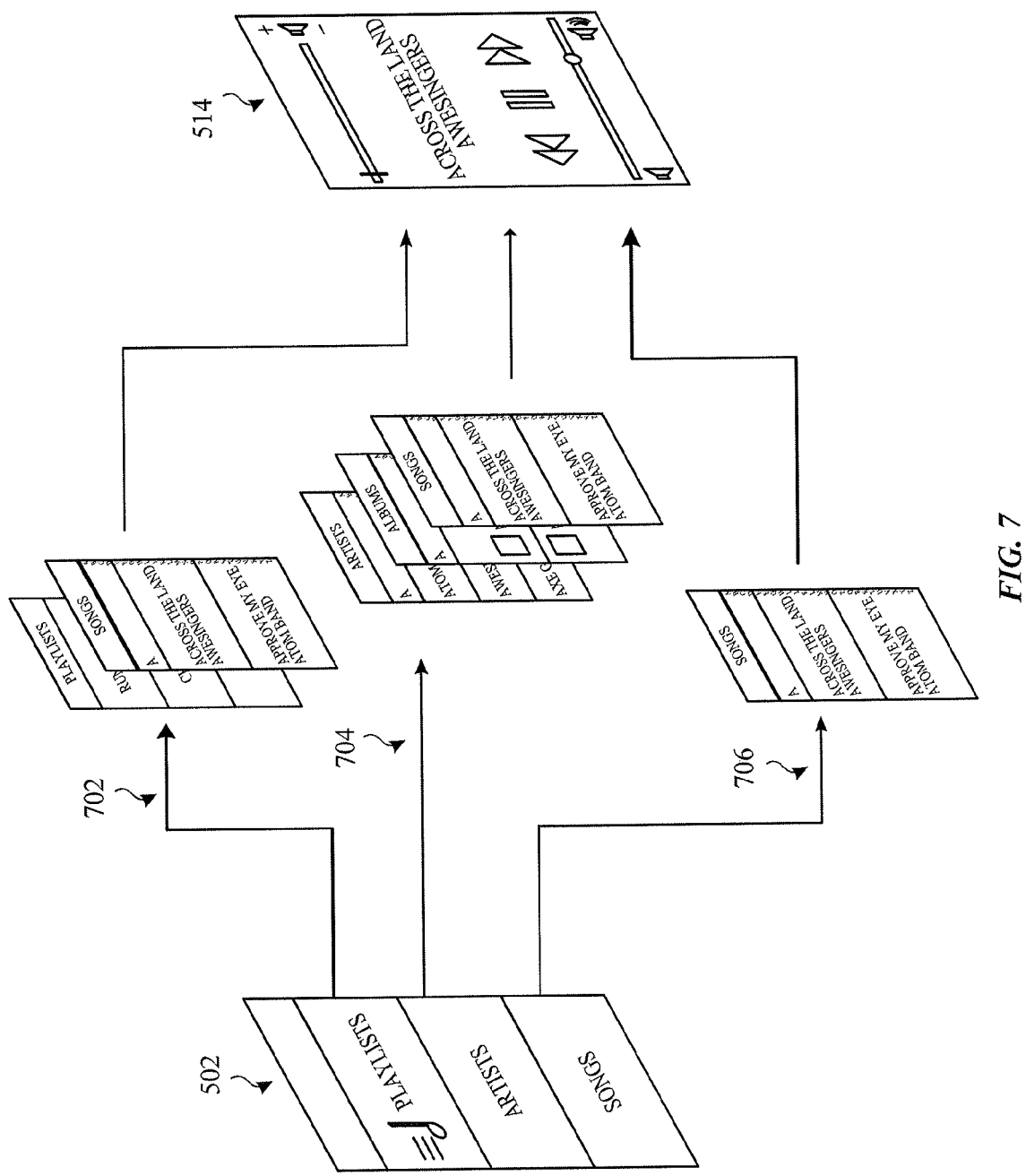
FIG. 7 illustrates different paths that can be selected to navigate between predefined user interface screen in accordance with some embodiments.

FIG. 7 depicts different paths 702, 704 and 706, which can be selected to navigate sequentially between main menu screen 502 and media playback screen 514. There may be zero or more user interface screens between a starting screen and a destination screen, not inclusive, along a path or navigational sequence from the starting screen to the destination screen. For example, from main menu screen 502 to media playback screen 514 for Song 1, there is, in one path, songs listing screen 508 in between main menu screen 502 and media playback screen 514 (e.g., as shown in FIGS. 5A-5C). In another path, there are artists listing screen 530 and Artist 1 screen 536 between main menu screen 502 and media playback screen 514 for Song 1.

By performing gesture 542 or 546, a user may navigate to main menu screen 502 or media playback screen 514 for a currently playing piece of media, respectively, from anywhere in the navigational hierarchy of user interface screens with just a single gesture. More generally, gestures that are the reverse of each other may each be associated with predefined user interface screens (e.g., frequently accessed screens such as main menu screen 502 and media playback screen 512) that are at opposite ends in the navigational hierarchy (for example, main menu screen 502 is at the root level and media playback screen 512 is typically a leaf level user interface screen). By performing either single gesture, a user may quickly navigate to the user interface screen associated with the respective gesture, without having to perform additional gestures to navigate through any intervening user interface screens in the hierarchy.

FIGS. 6A-6D are flow diagrams illustrating a method 600 of navigating between user interface screens in accordance with some embodiments. The method 600 is performed at a multifunction device (e.g., device 300, FIG. 3A, device 300-1, FIG. 3B, or portable multifunction device 100, FIG. 1) with a display and a touch-sensitive surface. In some embodiments, the display is a touch screen and the touch-sensitive surface is on the display. In some embodiments, the display is separate from the touch-sensitive surface. Some operations in method 600 may be combined and/or the order of some operations may be changed.

As described below, the method 600 provides an efficient way to navigate to two frequently used interface screens, such as a home screen and a media playback screen. The method reduces the cognitive burden on a user when of navigating between user interface screens, thereby creating a more efficient human-machine interface. For battery-operated computing devices, enabling a user to of navigate between user interface screens faster and more efficiently conserves power and increases the time between battery charges.

The device typically has a touch-sensitive display configured to separately display a plurality of user interface screens. As used herein, "separately displayed" means that the user interface screens are displayed one at a time on the display (except during brief transitions between user interface screens, where portions of two or more screens may be shown in an animated transition). The plurality of user interface screens includes a first predefined user interface screen and a second predefined user interface screen. A user of the device interacts with the device through the user interface screens.

The device displays (602) a third user interface screen in the plurality of user interface screens, where the third user interface screen is other than the first predefined user interface screen and the second predefined user interface screen. For example, in FIGS. 5A-5C, main menu screen 502 is the first predefined user interface screen and media playback screen 514 is the second predefined user interface screen. In FIG. 5B, a third user interface screen (songs listing screen 508) that is other than the first or second predefined user interface screen is displayed. As another example, in FIG. 5J, Artist 1 screen 536, which is neither main menu screen 502 nor media playback screen 514, is displayed. In a further example, in FIG. 5N, artists listing screen 530, which is neither main menu screen 502 nor media playback screen 514, is displayed.

In some embodiments, the first predefined user interface screen is a home screen (604), e.g., a main or root menu screen. In some embodiments, the home screen is a main screen for a single application, such as a music player, with a hierarchical arrangement of categories within the single application. In some other embodiments, the home screen is a main screen for a plurality of applications (e.g., a screen that lists a plurality of applications that may be selected by a user). An example of a home screen is main menu screen 502 in FIG. 5A.

In some embodiments, the second predefined user interface screen is a media playback screen (606), e.g., a "now playing" screen with playback controls for managing playback of a currently playing or selected piece of media (e.g., audio, video). The media playback screen may also display information about the currently playing or selected piece of media. An example of a media playback screen is media playback screen 514.

The device detects (610) a finger gesture on the touch-sensitive display while displaying the third user interface screen. For example, in FIG. 5J, while Artist 1 screen 536 is displayed, gesture 542 is detected. In another example, in FIG. 5N, while artists listing screen 530 is displayed, gesture 546 is detected.

In response to detecting the finger gesture on the touch-sensitive display, the device replaces (612) display of the third user interface screen with display of the first predefined user interface screen when the detected finger gesture is a first finger gesture, and replaces (614) display of the third user interface screen with display of the second predefined user interface screen when the detected finger gesture is a second finger gesture that is a reverse of the first finger gesture. For example, in FIGS. 5J-5M, in response to detection of gesture 542, the display of Artist 1 screen 536 is replaced with the display of main menu screen 502. Alternatively, in FIGS. 5N-5Q, in response to detection of gesture 546, the display of artists listing screen 530 is replaced with the display of media playback screen 514. It should be appreciated that gesture 546 is the reverse of gesture 542; the movements 543-A and 543-B in gesture 542 are in a direction that is opposite to the movements 547-A and 547-B in gesture 546.

In some embodiments, the plurality of user interface screens is hierarchically ordered, with one or more user interface screens between the first predefined user interface screen and the second predefined user interface screen (608). The plurality of user interface screens on the device forms a navigational hierarchy, where navigation from user interface screen to user interface screen through the hierarchy starts at a root level screen (e.g., main menu screen 502) and from the root level branches out into one or more sublevels. Along a navigational path through the hierarchy, from the first predefined user interface screen (e.g., main menu screen 502) to the second predefined user interface screen (media playback screen 514 for a piece of media), there are one or more user interface screens between, but not including, the first and second predefined user interface screens. For example, in FIGS. 5A-5I, main menu screen 502 is the root level screen in a hierarchy of user interface screens. From main menu screen 502, one can navigate to various branches in the hierarchy by selecting a respective link 510. For example, a path from main menu screen 502 to media playback screen 514 for Song 1 through a "Songs" branch (corresponding to Songs link 510-1) is depicted in FIGS. 5A-5C. A path from main menu screen 502 to media playback screen 514 for Song 4 through an "Albums" branch (corresponding to Albums link 510-2) is depicted in FIGS. 5A, 5D-5F. A path from main menu screen 502 to media playback screen 514 for Song 3 through an "Artists" branch (corresponding to Artists link 510-3) is depicted in FIGS. 5A, 5G-5I. In each of these example paths, there are one or more user interface screens (e.g., songs listing screen 508, albums listing screen 518, Album 2 screen 524, artists listings screen 530, Artist 1 screen 536) between main menu screen 502 and media playback screen 514.

In some embodiments, in response to detecting the finger gesture on the touch-sensitive display, the device replaces (616) display of the third user interface screen with display of a fourth user interface screen in the plurality of user interface screens, the fourth user interface screen being other than the first predefined user interface screen and the second predefined user interface screen, when the detected finger gesture is a third finger gesture other than the first finger gesture and the second finger gesture. For example, in some embodiments, as described above with respect to FIGS. 5J-5Q, if a gesture is detected that is like gesture 542 or 546 except for the number of finger contacts (e.g., one finger instead of two), then the user interface screen currently displayed is replaced by the immediately preceding or succeeding user interface screen, depending on the direction of the detected gesture. In some other embodiments, if a gesture is detected that is like 542 or 546 except for the number of finger contacts (e.g., one finger instead of two), then the user interface screen currently displayed is replaced by a predefined user interface screen, other than main menu screen 502 and media playback screen 514, that is associated with the respective one-finger gesture. Further, in some embodiments, additional gestures (e.g., a two-finger swipe gesture vertically upward and a two-finger swipe gesture vertically downward, or one-finger versions of same) are also associated with respective predefined user interface screens; detection of any of these additional gestures activates direct navigation to the respective user interface screen associated with the detected gesture. For example, a two-finger upward gesture may activate display of a listing of genres and a two-finger downward gesture may activate display of a listing of albums (e.g., as in Albums screen 518). In some embodiments, the predefined user interface screens associated with respective one-finger and two-finger gestures are customizable by a user. In another example, the third finger gesture is a tap gesture that is located on a user interface object (e.g., Back button 507). In response to detection of the tap gesture on Back button 507, the currently displayed user interface screen is replaced with display of the immediately preceding user interface screen.

In some embodiments, the plurality of user interface screens is hierarchically ordered, with one or more user interface screens between the first predefined user interface screen and the second predefined user interface screen, and the fourth user interface screen is hierarchically adjacent to the third user interface screen in the plurality of hierarchically ordered user interface screens (618). In one example, if a gesture that is like 542 or 546 except for the number of finger contacts (e.g., one finger instead of two) is detected, then the user interface screen currently displayed is replaced by the immediately preceding or succeeding (i.e., adjacent within the hierarchy of user interface screens) user interface screen, depending on the direction of the detected gesture. In another example, a tap gesture is detected on Back button 507, and in response the user interface screen currently displayed is replaced by the immediately preceding user interface screen.

In some embodiments, the third finger gesture is an M-finger gesture and the first finger gesture and the second finger gesture are N-finger gestures, where M is an integer (e.g., from 1 to 4) and N is an integer (e.g., from 1 to 4) other than M (620). In some embodiments, the third finger gesture is a single-finger gesture (i.e., M=1) and the first finger gesture and the second finger gesture are two-finger gestures (i.e., N=2) (622). As in the example described above, the first and second finger gestures (e.g., gestures 542, 546) have a particular number of finger contacts and the third finger gesture (e.g., the gestures for navigating to the immediately preceding or succeeding user interface screen) has a different particular number of finger contacts. In one example, the first and second finger gestures (e.g., gestures 542 and 546) are two-finger gestures (i.e., each have two finger contacts) and the third finger gesture is a one-finger gesture (i.e., has one finger contact).

In some embodiments, the first finger gesture is a two-finger swipe gesture in a first direction, the second finger gesture is a two-finger swipe gesture in a direction that is opposite the first direction, and the third finger gesture is a single-finger gesture (624) (e.g., a tap or swipe gesture). In one example, gesture 542 (the first finger gesture) is a two-finger swipe gesture in one direction, gesture 546 (the second finger gesture) is a two-finger swipe gesture in the opposite direction, and the gesture for navigating to an adjacent user interface screen is a one-finger gesture (e.g., a swipe gesture in the same direction as gesture 542 or 546, or a tap gesture on Back button 507).

In some embodiments, in response to detecting the first finger gesture, the device displays (626) a first animation transitioning from the third user interface screen to the first predefined user interface screen. For example, the third user interface screen slides out of view and the home screen slides into view on the display. In some embodiments, the first animation includes user interface screens along a hierarchical path between the third user interface screen and the first predefined user interface screen (628).

In some embodiments, in response to detecting the second finger gesture, the device displays (630) a second animation transitioning from the third user interface screen to the second predefined user interface screen. For example, the third user interface screen slides out of view and the media playback screen slides into view on the display. In some embodiments, the second animation includes user interface screens along a hierarchical path between the third user interface screen and the second predefined user interface screen (632).

The first or second animation may show the user interface screens that are bypassed in navigating from the third user interface screen to the first or second user interface screen, respectively. For example, in FIGS. 5J-5M, an animation showing a transition from Artist 1 screen 536 to main menu screen 502, and the user interface screens between the two (e.g., artists listing screen 530), is displayed. In another example, in FIGS. 5N-5Q, an animation showing a transition from artists listing screen 530 to media playback screen 514, and the user interface screens between the two (e.g., Artist 1 screen 536), is displayed.

In some embodiments, in response to detecting the third finger gesture, the device displays an animation transitioning from the third user interface screen to the fourth user interface screen. Thus, an animation may be displayed even if the user interface screen to be replaced and the replacement user interface screen are adjacent in the hierarchy.

In some embodiments, the device displays (634) the first predefined user interface screen, detects (636) the second finger gesture on the touch-sensitive display while displaying the first predefined user interface screen, and, in response to detecting the second finger gesture while displaying the first predefined user interface screen, replaces (638) display of the first predefined user interface screen with display of the second predefined user interface screen. For example, in FIG. 5S, gesture 546 is detected while main menu screen 502 is displayed. In response to detection of gesture 546, display of main menu screen 502 is replaced with media playback screen 514 for whichever piece of media is currently playing (or, in some embodiments, if no piece of media is currently playing, the media playback screen 514 for the most recently played piece of media is displayed).

In some embodiments, in response to detecting the second finger gesture while displaying the first predefined user interface screen, the device displays (640) a third animation transitioning from the first predefined user interface screen to the second predefined user interface screen. In some embodiments, the third animation includes user interface screens along a hierarchical path between the first predefined user interface screen and the second predefined user interface screen (642). For example, in response to detection of gesture 546 while main menu screen 502 is displayed (FIG. 5S), an animation (e.g., user interface screens sliding into or out of view) showing the replacement of main menu screen 502 with media playback screen 514 is displayed. The animation may include user interface screens that are between main menu screen 502 and media playback screen 514 along the hierarchal path between the two (e.g., depending on the actual path, songs listing screen 508, Artist 1 screen 536, etc.).

In some embodiments, if the second finger gesture is detected when the second predefined user interface screen is displayed, a third predefined user interface screen is displayed in place of the second predefined user interface screen. For example, if gesture 546 is detected when media playback screen 514 is displayed, display of media playback screen 514 is replaced with, for example, display of a list of songs in the album to which the currently playing song belongs (e.g., as in Album 2 screen 524). In some other embodiments, if the second finger gesture is detected when the second predefined user interface screen is displayed, the second finger gesture is ignored.

In some embodiments, the device displays (644) the second predefined user interface screen, detects (646) the first finger gesture on the touch-sensitive display while displaying the second predefined user interface screen, and, in response to detecting the first finger gesture while displaying the second predefined user interface screen, replaces display of the second predefined user interface screen with display of the first predefined user interface screen (648). For example, in FIG. 5R, gesture 542 is detected while media playback screen 514 is displayed. In response to detection of gesture 542, display of media playback screen 514 is replaced with main menu screen 502.

In some embodiments, if the first finger gesture is detected when the first predefined user interface screen is displayed, a fourth predefined user interface screen is displayed in place of the first predefined user interface screen. For example, if gesture 542 is displayed when main menu screen 502 is displayed, display of main menu screen 502 is replaced with, for example, display of a user interface screen showing a clock or display of a user interface screen showing options for customizing main menu screen 502 (e.g., custom wallpaper, settings, etc.). In some other embodiments, if the first finger gesture is detected when the first predefined user interface screen is displayed, the gesture is ignored.

In some embodiments, in response to detecting the first finger gesture while displaying the second predefined user interface screen, the device displays (650) a fourth animation transitioning from the second predefined user interface screen to the first predefined user interface screen. In some embodiments, the fourth animation includes user interface screens along a hierarchical path between the second predefined user interface screen and the first predefined user interface screen (652). For example, in response to detection of gesture 542 while media playback screen 514 is displayed (FIG. 5R), an animation (e.g., user interface screens sliding into or out of view) showing the replacement of media playback screen 514 with main menu screen 502 is displayed. The animation may include user interface screens that are between main menu screen 502 and media playback screen 514 along the hierarchal path between the two (e.g., depending on the actual path, songs listing screen 508, Artist 1 screen 536, etc.).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, 3A, 3B) are all included within the scope of protection of the invention.

The operations described above with reference to FIGS. 6A-6D, may be implemented by components depicted in FIGS. 1A-1C. For example, detection operation 610 and replacement operations 612 and 614 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176, object updater 177 or GUI updater 178 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
a touch-sensitive display, the touch-sensitive display configured to separately display a plurality of hierarchically ordered user interface screens within a single application, the hierarchically ordered user interface screens including a first predefined user interface screen and a second predefined user interface screen with one or more user interface screens in the hierarchically ordered user interface screens in a plurality of user selectable paths between the first predefined user interface screen and the second predefined user interface screen;
one or more processors;
memory; and
one or more programs, wherein the one or more programs are stored in the memory and configured to be executed by the one or more processors, the one or more programs including instructions for:
    displaying a third user interface screen in the plurality of user interface screens, the third user interface screen belonging to a selected path in the hierarchically ordered user interface screens and being between the first predefined user interface screen and the second predefined user interface screen;
    detecting a finger gesture on the touch-sensitive display while displaying the third user interface screen;
    in response to detecting the finger gesture on the touch-sensitive display:
        replacing display of the third user interface screen with display of the first predefined user interface screen when the detected finger gesture is a two-finger swipe gesture in a first direction;
        replacing display of the third user interface screen with display of the second predefined user interface screen when the detected finger gesture is a two-finger swipe gesture in a direction that is opposite the first direction;
    displaying the first predefined user interface screen;
    detecting a two-finger swipe gesture in the direction that is opposite the first direction on the touch-sensitive display while displaying the first predefined user interface screen;
    in response to detecting the two-finger swipe gesture in the direction that is opposite the first direction while displaying the first predefined user interface screen, replacing display of the first predefined user interface screen with display of the second predefined user interface screen;
displaying the second predefined user interface screen;
detecting a two-finger swipe gesture in the first direction on the touch-sensitive display while displaying the second predefined user interface screen;
in response to detecting the two-finger swipe gesture in the first direction while displaying the second predefined user interface screen, replacing display of the second predefined user interface screen with display of the first predefined user interface screen; and
in response to detecting a single-finger swipe gesture while displaying the second predefined user interface screen, replacing display of the second predefined user interface screen with display of a fourth user interface screen by navigating sequentially to the selected path.

2. The device of claim 1, wherein the first predefined user interface screen is a home screen.

3. The device of claim 1, wherein the second predefined user interface screen is a media playback screen.

4. The device of claim 1, including instructions for:
in response to detecting the finger gesture on the touch-sensitive display:
replacing display of the third user interface screen with display of the fourth user interface screen in the plurality of user interface screens, the fourth user interface screen being other than the first predefined user interface screen and the second predefined user interface screen, when the detected finger gesture is a single-finger gesture.

5. The device of claim 4, wherein:
the fourth user interface screen is hierarchically adjacent to the third user interface screen in the plurality of hierarchically ordered user interface screens.

6. The device of claim 1, wherein the portable electronic device is a music player.

7. The device of claim 1, including instructions for:
in response to detecting a single-finger swipe gesture in a first direction while displaying the third user interface screen, navigating sequentially in a first direction of the hierarchically ordered user interface screens of the selected path; and
in response to detecting a single-finger swipe gesture in a direction that is opposite the first direction while displaying the third user interface screen, navigating sequentially in the opposite direction of the hierarchically ordered user interface screens of the selected path.

8. The device of claim 1, including instructions for:
in response to detecting the two-finger swipe gesture in the first direction while displaying the second predefined user interface screen, displaying an animation transitioning from the second predefined user interface screen to the first predefined user interface screen, wherein the animation includes user interface screens in the selected path between the second predefined user interface screen and the first predefined user interface screen.

9. A method, comprising:
at a portable electronic device with a touch-sensitive display, the touch-sensitive display configured to separately display a plurality of hierarchically ordered user interface screens within a single application, the hierarchically ordered user interface screens including a first predefined user interface screen and a second predefined user interface screen with one or more user interface screens in the hierarchically ordered user interface screens in a plurality of user selectable paths between the first predefined user interface screen and the second predefined user interface screen:
displaying a third user interface screen in the plurality of user interface screens, the third user interface screen belonging to a selected path in the hierarchically ordered user interface screens and being between the first predefined user interface screen and the second predefined user interface screen;
detecting a finger gesture on the touch-sensitive display while displaying the third user interface screen; and
in response to detecting the finger gesture on the touch-sensitive display:
replacing display of the third user interface screen with display of the first predefined user interface screen when the detected finger gesture is a two-finger swipe gesture in a first direction;
replacing display of the third user interface screen with display of the second predefined user interface screen when the detected finger gesture is a two-finger swipe gesture in a direction that is opposite the first direction;
displaying the first predefined user interface screen;
detecting a two-finger swipe gesture in the direction that is opposite the first direction on the touch-sensitive display while displaying the first predefined user interface screen;
in response to detecting the two-finger swipe gesture in the direction that is opposite the first direction while displaying the first predefined user interface screen, replacing display of the first predefined user interface screen with display of the second predefined user interface screen;
displaying the second predefined user interface screen;
detecting a two-finger swipe gesture in the first direction on the touch-sensitive display while displaying the second predefined user interface screen;
in response to detecting the two-finger swipe gesture in the first direction while displaying the second predefined user interface screen, replacing display of the second predefined user interface screen with display of the first predefined user interface screen; and
in response to detecting a single-finger swipe gesture while displaying the second predefined user interface screen, replacing display of the second predefined user interface screen with display of a fourth user interface screen by navigating sequentially to the selected path.

10. The method of claim 9, wherein the first predefined user interface screen is a home screen.

11. The method of claim 9, wherein the second predefined user interface screen is a media playback screen.

12. The method of claim 9, further comprising:
in response to detecting the finger gesture on the touch-sensitive display:
replacing display of the third user interface screen with display of the fourth user interface screen in the plurality of user interface screens, the fourth user interface screen being other than the first predefined user interface screen and the second predefined user interface screen, when the detected finger gesture is a single-finger gesture.

13. The method of claim 12, wherein:
the fourth user interface screen is hierarchically adjacent to the third user interface screen in the plurality of hierarchically ordered user interface screens.

14. The method of claim 9, wherein the portable electronic device is a music player.

15. A non-transitory computer readable storage medium storing one or more programs, the one or more programs comprising instructions, which when executed by a portable electronic device with a touch-sensitive display, the touch-sensitive display configured to separately display a plurality of hierarchically ordered user interface screens within a single application, the hierarchically ordered user interface screens including a first predefined user interface screen and a second predefined user interface screen with one or more user interface screens in the hierarchically ordered user interface screens in a plurality of user selectable paths between the first predefined user interface screen and the second predefined user interface screen, cause the device to:

display a third user interface screen in the plurality of user interface screens, the third user interface screen belonging to a selected path in the hierarchically ordered user interface screens and being between the first predefined user interface screen and the second predefined user interface screen;

detect a finger gesture on the touch-sensitive display while displaying the third user interface screen;

in response to detecting the finger gesture on the touch-sensitive display:

replace display of the third user interface screen with display of the first predefined user interface screen when the detected finger gesture is a two-finger swipe gesture in a first direction;

replace display of the third user interface screen with display of the second predefined user interface screen when the detected finger gesture is a two-finger swipe gesture in a direction that is opposite the first direction;

display the first predefined user interface screen;

detect a two-finger swipe gesture in the direction that is opposite the first direction on the touch-sensitive display while displaying the first predefined user interface screen;

in response to detecting the two-finger swipe gesture in the direction that is opposite the first direction while displaying the first predefined user interface screen, replace display of the first predefined user interface screen with display of the second predefined user interface screen;

display the second predefined user interface screen;

detect a two-finger swipe gesture in the first direction on the touch-sensitive display while displaying the second predefined user interface screen;

in response to detecting the two-finger swipe gesture in the first direction while displaying the second predefined user interface screen, replace display of the second predefined user interface screen with display of the first predefined user interface screen; and in response to detecting a single-finger swipe gesture while displaying the second predefined user interface screen, replacing display of the second predefined user interface screen with display of a fourth user interface screen by navigating sequentially to the selected path.

16. The non-transitory computer readable storage medium of claim 15, wherein the first predefined user interface screen is a home screen.

17. The non-transitory computer readable storage medium of claim 15, wherein the second predefined user interface screen is a media playback screen.

18. The non-transitory computer readable storage medium of claim 15, further including instructions which cause the device to:

in response to detecting the finger gesture on the touch-sensitive display:

replace display of the third user interface screen with display of the fourth user interface screen in the plurality of user interface screens, the fourth user interface screen being other than the first predefined user interface screen and the second predefined user interface screen, when the detected finger gesture is a single-finger gesture.

19. The non-transitory computer readable storage medium of claim 18, wherein:

the fourth user interface screen is hierarchically adjacent to the third user interface screen in the plurality of hierarchically ordered user interface screens.

20. The non-transitory computer readable storage medium of claim 15, wherein the portable electronic device is a music player.

* * * * *

UNITED STATES PATENT AND TRADEMARK OFFICE
CERTIFICATE OF CORRECTION

PATENT NO. : 8,972,903 B2  
APPLICATION NO. : 12/832900  
DATED : March 3, 2015  
INVENTOR(S) : Bryan J. James et al.

Page 1 of 1

It is certified that error appears in the above-identified patent and that said Letters Patent is hereby corrected as shown below:

On Title page, in item (54), in "Title", in column 1, lines 1-3, delete "USING GESTURE TO NAVIGATE HIERARCHICALLY ORDERED USER INTERFACE SCREENS" and insert -- NAVIGATION OF HIERARCHICALLY ORDERED USER INTERFACE SCREENS USING GESTURES --, therefor.

On the page 2, in column 2, under "Other Publications", line 2, delete "1 2011274519," and insert --2011274519, --, therefor.

In the Specification

In column 1, lines 1-3, delete "USING GESTURE TO NAVIGATE HIERARCHICALLY ORDERED USER INTERFACE SCREENS" and insert -- NAVIGATION OF HIERARCHICALLY ORDERED USER INTERFACE SCREENS USING GESTURES --, therefor.

Signed and Sealed this  
Twenty-fifth Day of August, 2015

Michelle K. Lee  
*Director of the United States Patent and Trademark Office*